United States Patent
Ahn et al.

(10) Patent No.: US 7,528,909 B2
(45) Date of Patent: May 5, 2009

(54) LIQUID CRYSTAL DISPLAY DEVICE AND FABRICATING METHOD HAVING REFLECTIVE ELECTRODE CONNECTING PIXEL ELECTRODE WITH DRAIN AND UPPER STORAGE CAPACITOR ELECTRODES AT EDGE OF TRANSMISSION HOLE

(75) Inventors: Byung Chul Ahn, Anyang-si (KR); Jong Woo Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 706 days.

(21) Appl. No.: 11/139,501

(22) Filed: May 31, 2005

(65) Prior Publication Data

US 2005/0270450 A1     Dec. 8, 2005

(30) Foreign Application Priority Data

Jun. 5, 2004    (KR)   ............... 10-2004-0041139

(51) Int. Cl.
    *G02F 1/1335*     (2006.01)
(52) U.S. Cl. .................. 349/114; 349/46; 349/113; 349/147
(58) Field of Classification Search ................. 349/114, 349/46, 113, 147
See application file for complete search history.

(56) References Cited

U.S. PATENT DOCUMENTS

| 5,162,933 | A | 11/1992 | Kakuda et al. |
| 5,317,433 | A | 5/1994 | Miyawaki et al. |
| 5,339,181 | A | 8/1994 | Kim et al. |
| 5,462,887 | A | 10/1995 | Glück |
| 5,668,379 | A | 9/1997 | Ono et al. |
| 5,731,856 | A | 3/1998 | Kim et al. |
| 5,771,083 | A | 6/1998 | Fujihara et al. |
| 5,793,460 | A | 8/1998 | Yang |
| 5,847,781 | A | 12/1998 | Ono et al. |
| 6,806,927 | B2 * | 10/2004 | Nimura ...................... 349/113 |
| 7,023,508 | B2 * | 4/2006 | You .......................... 349/113 |

FOREIGN PATENT DOCUMENTS

| JP | 02-019840 | 1/1990 |
| JP | 2002-141512 | 5/2002 |

(Continued)

*Primary Examiner*—David Nelms
*Assistant Examiner*—John Heyman
(74) *Attorney, Agent, or Firm*—McKenna Long & Aldridge LLP

(57) ABSTRACT

A method of fabricating a LCD device includes forming a gate line, a gate electrode, and a pixel electrode having a double-layer structure on a first substrate using a first mask, the double-layer structure including first and second conductive layers; forming a first insulation film, a semiconductor pattern on the first insulation film, a source/drain pattern having an upper storage electrode, source and drain electrodes, a data line using a second mask, the data and gate lines defining a pixel region having transmission and reflection areas; forming a second insulation film on the source/drain pattern and a transmission hole by passing through the second insulation film to the second conductive layer in the transmission area using a third mask; and forming a reflective electrode in the reflection area using a fourth mask, the reflective electrode connecting the pixel electrode with the drain electrode and the storage electrode.

30 Claims, 37 Drawing Sheets

FOREIGN PATENT DOCUMENTS

| | | |
|---|---|---|
| JP | 2002-182239 | 6/2002 |
| JP | 2003-255378 | 9/2003 |
| JP | 2004-046223 | 2/2004 |
| JP | 2004-070355 | 3/2004 |
| JP | 2004-101792 | 4/2004 |
| JP | 2005-352479 | 12/2005 |
| WO | WO 03/107434 A1 | 12/2003 |

* cited by examiner

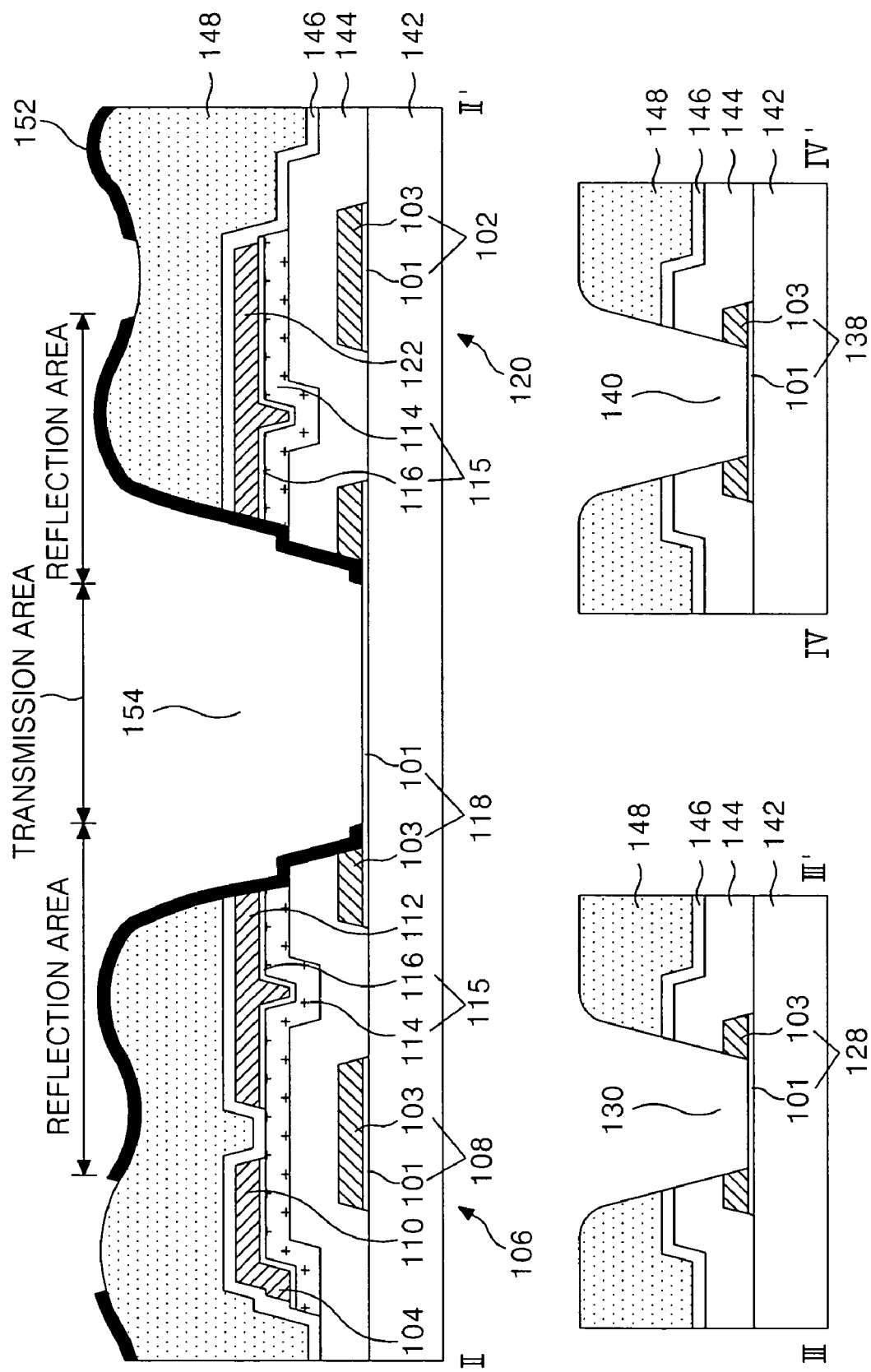

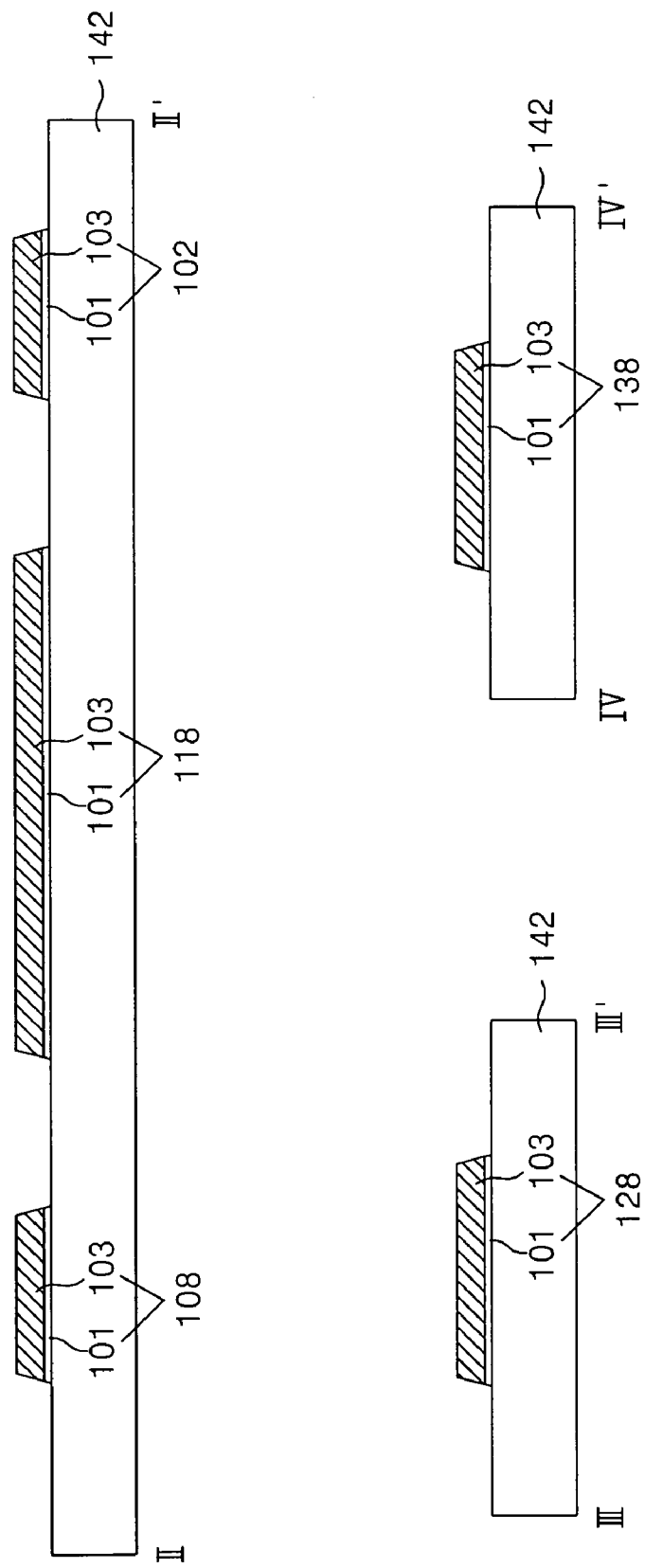

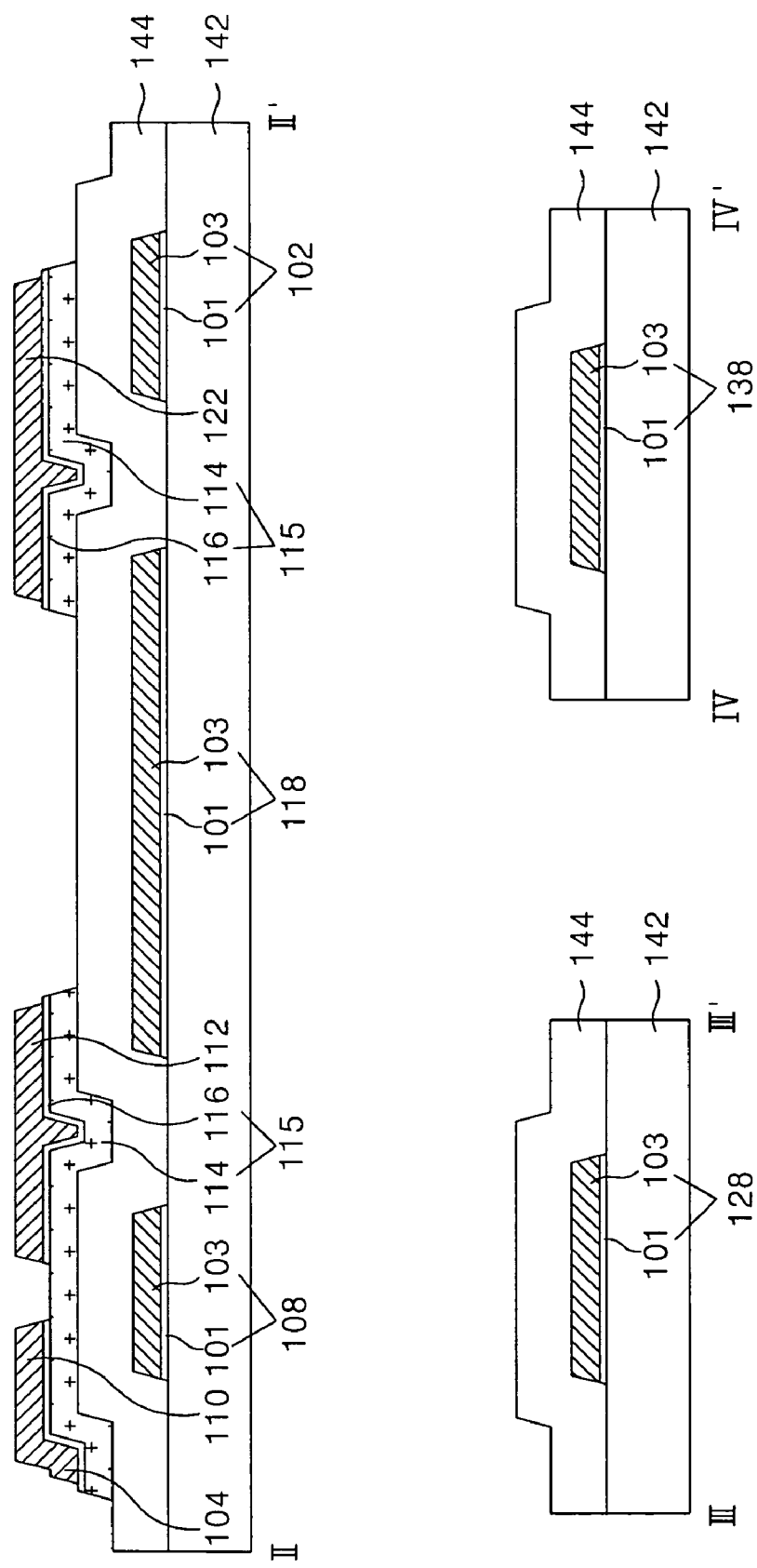

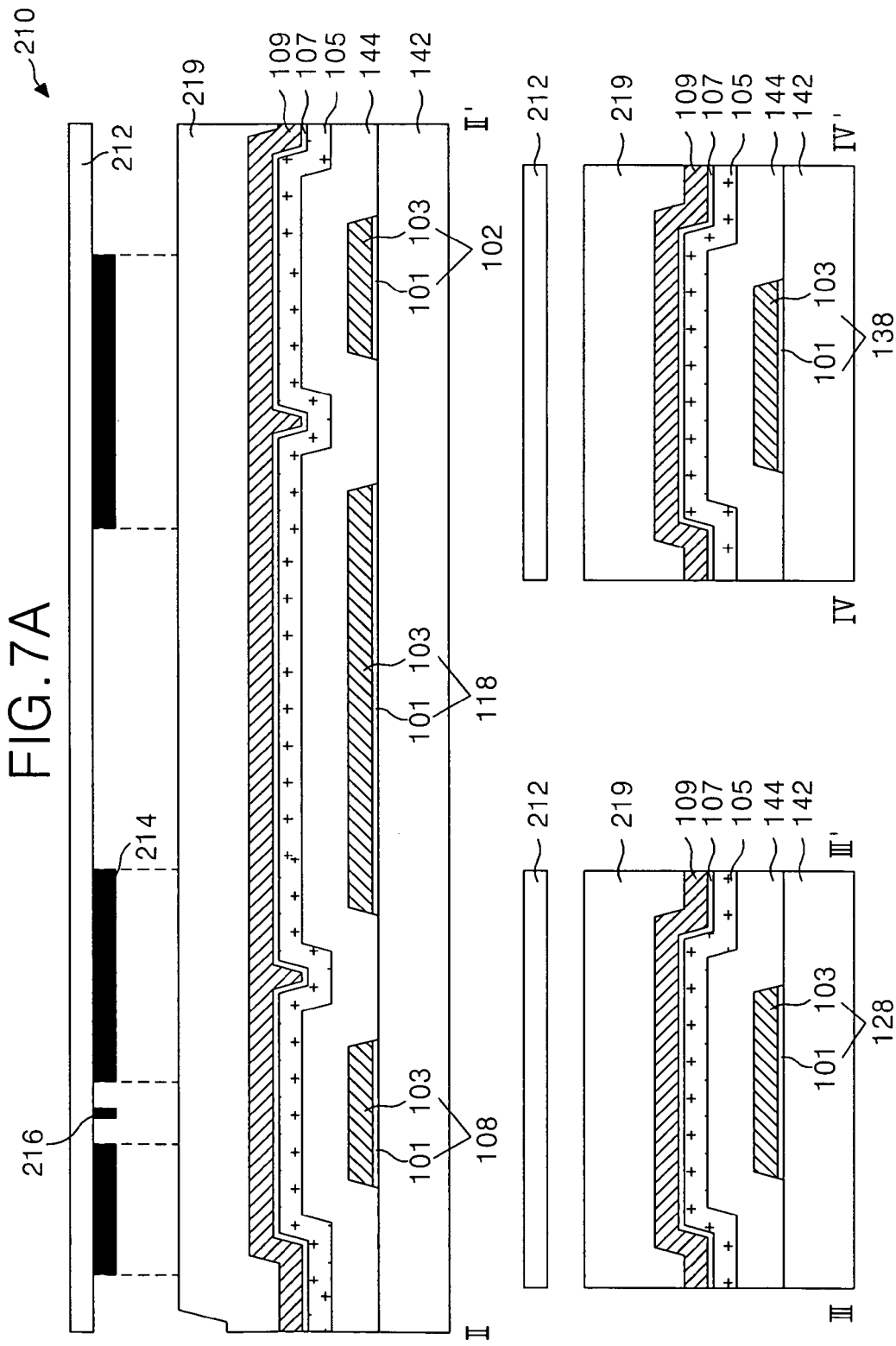

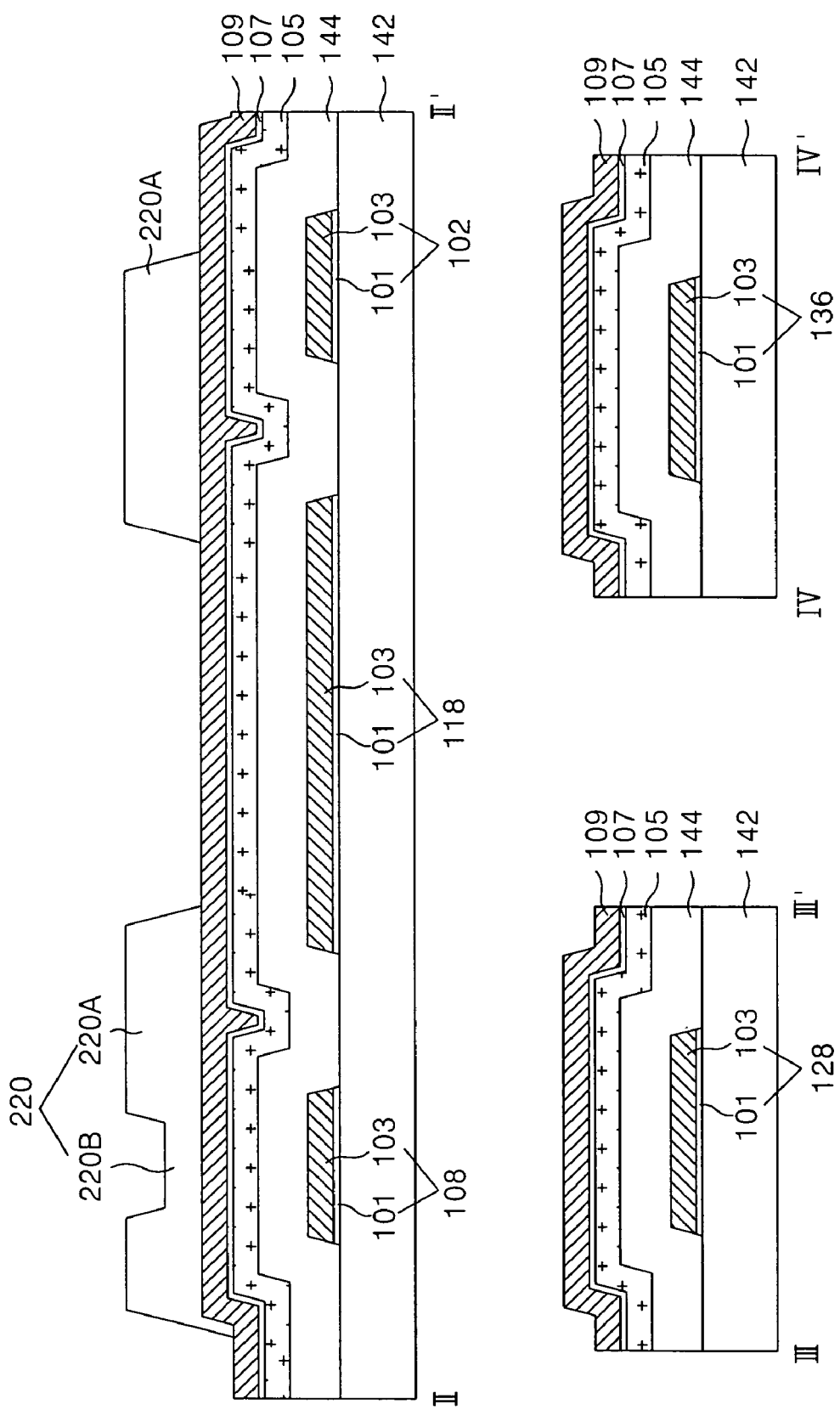

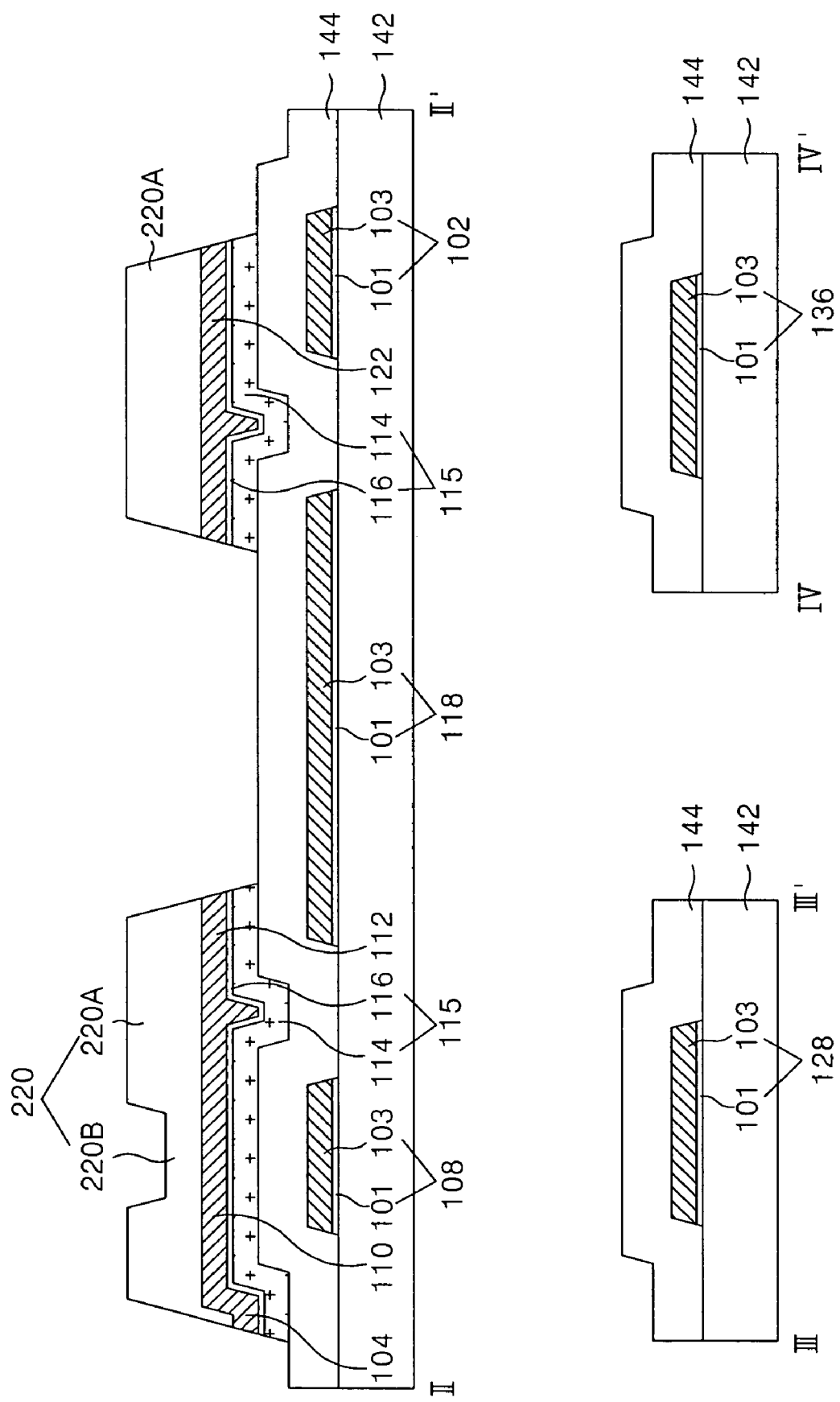

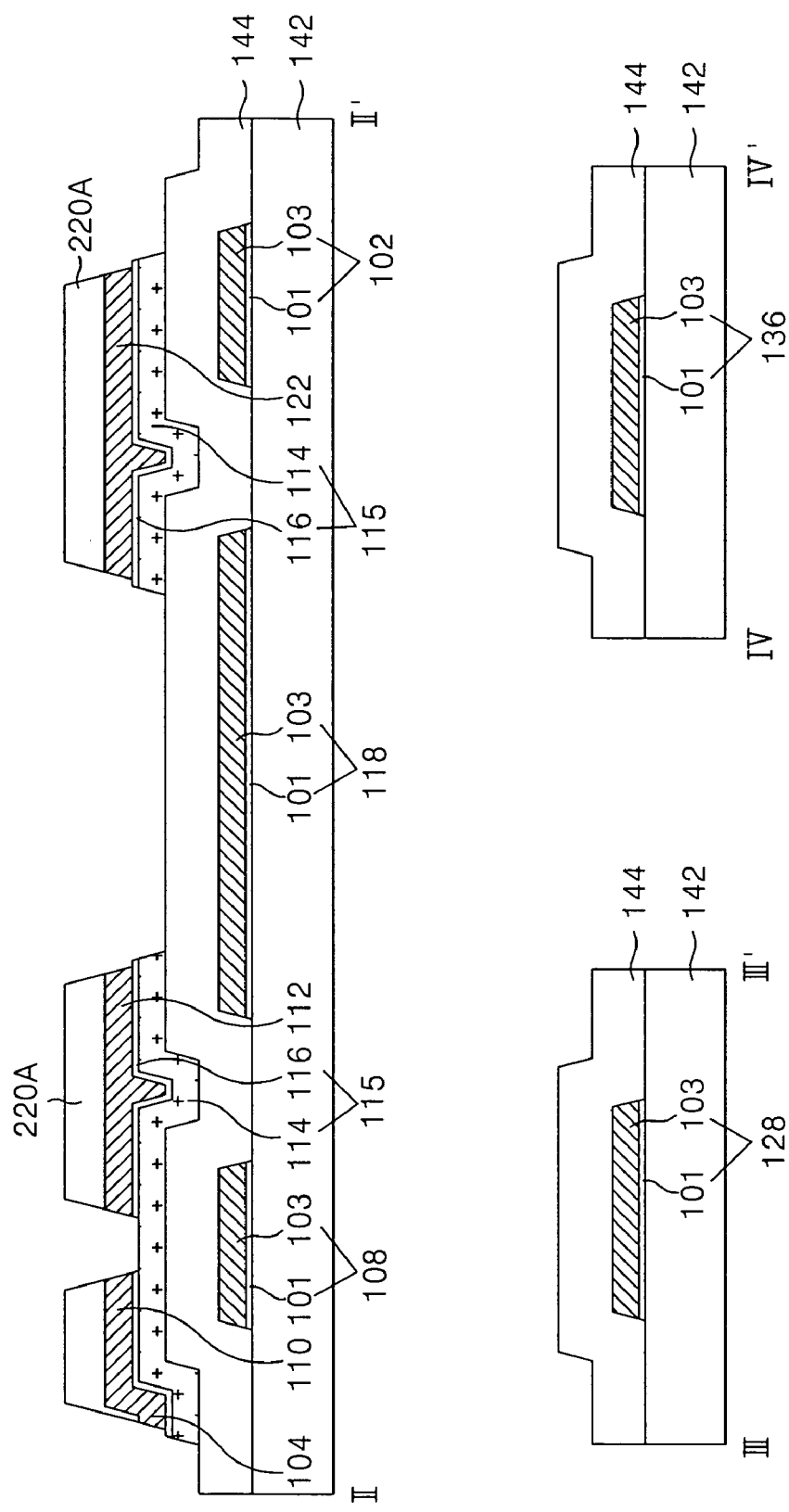

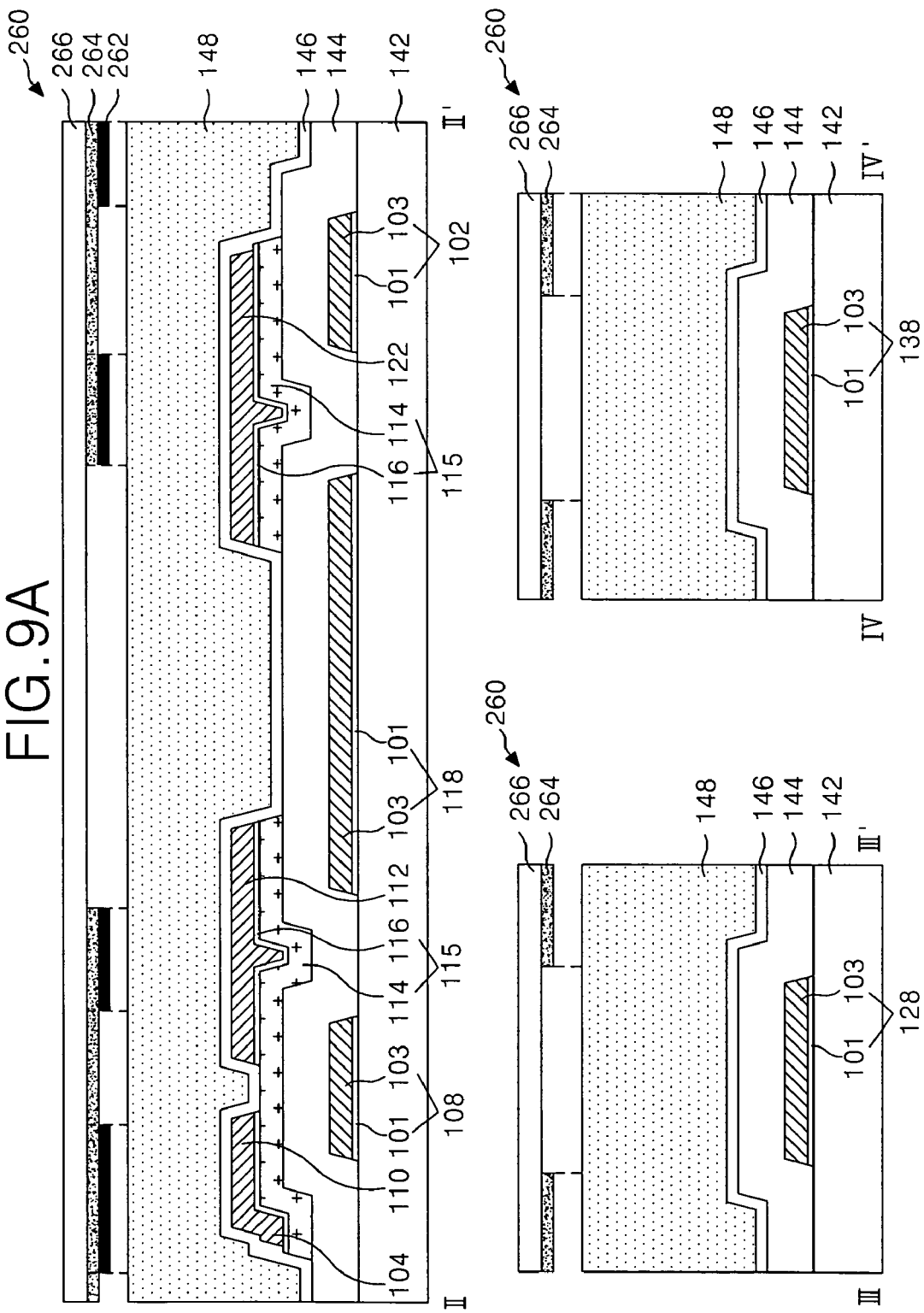

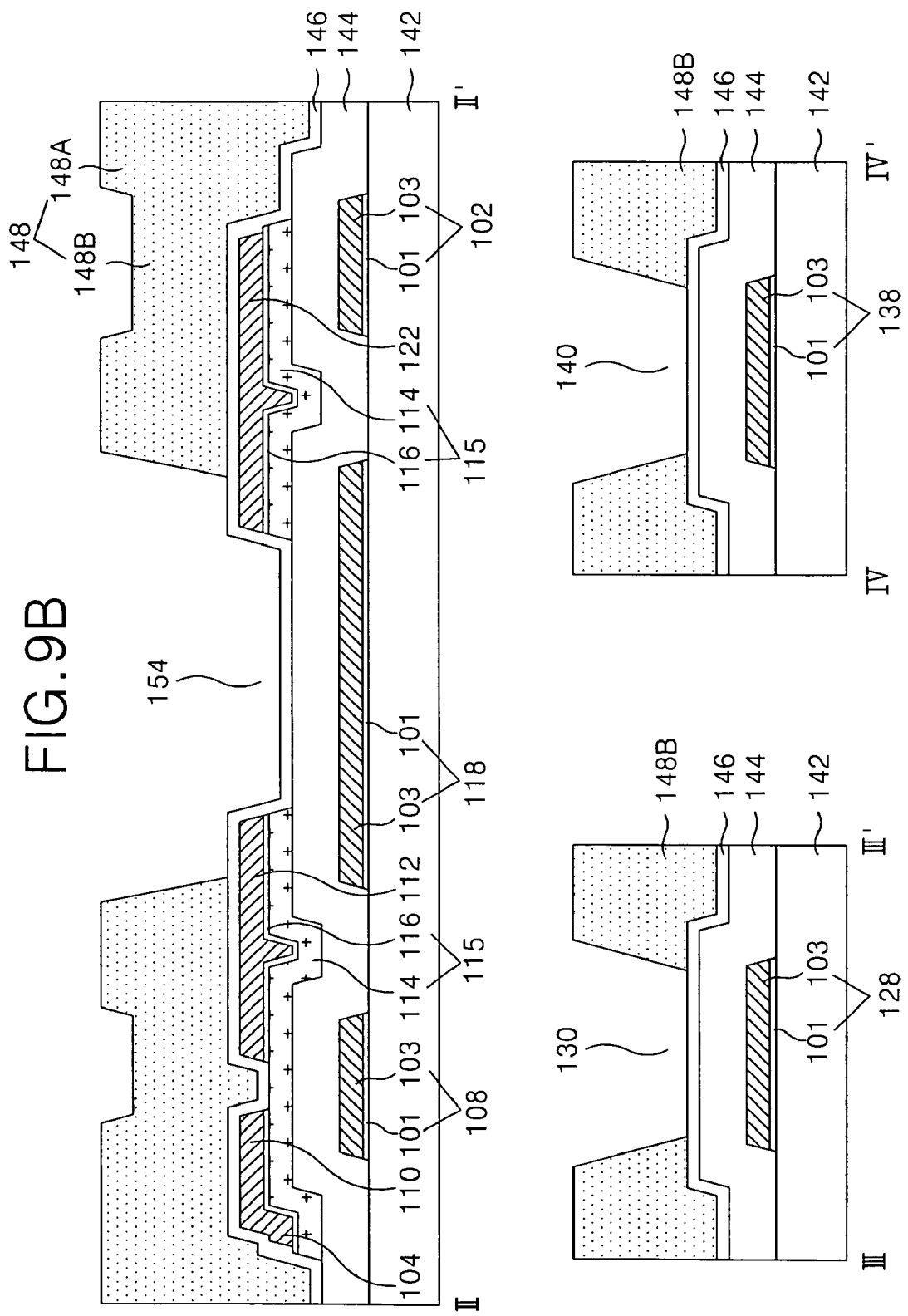

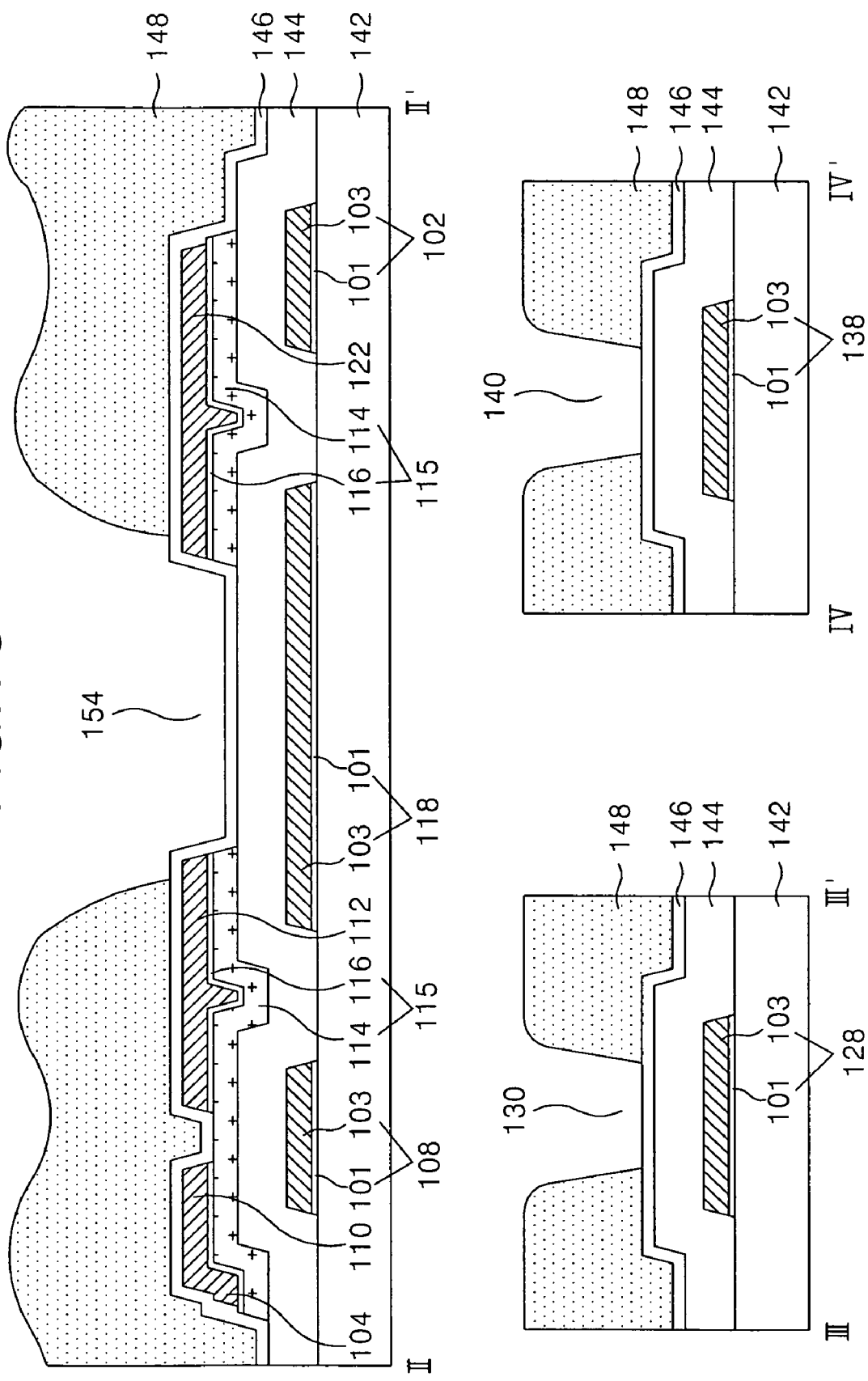

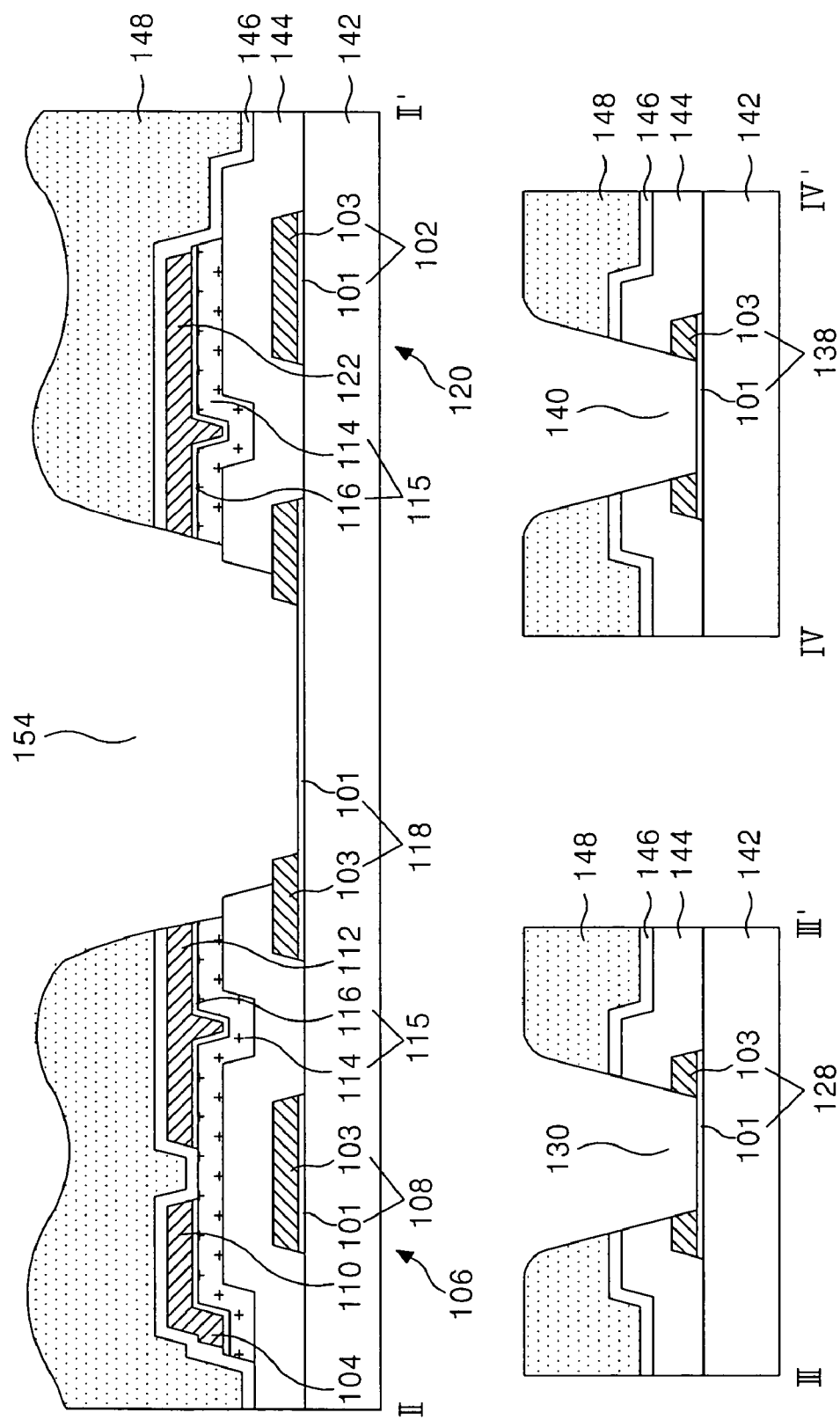

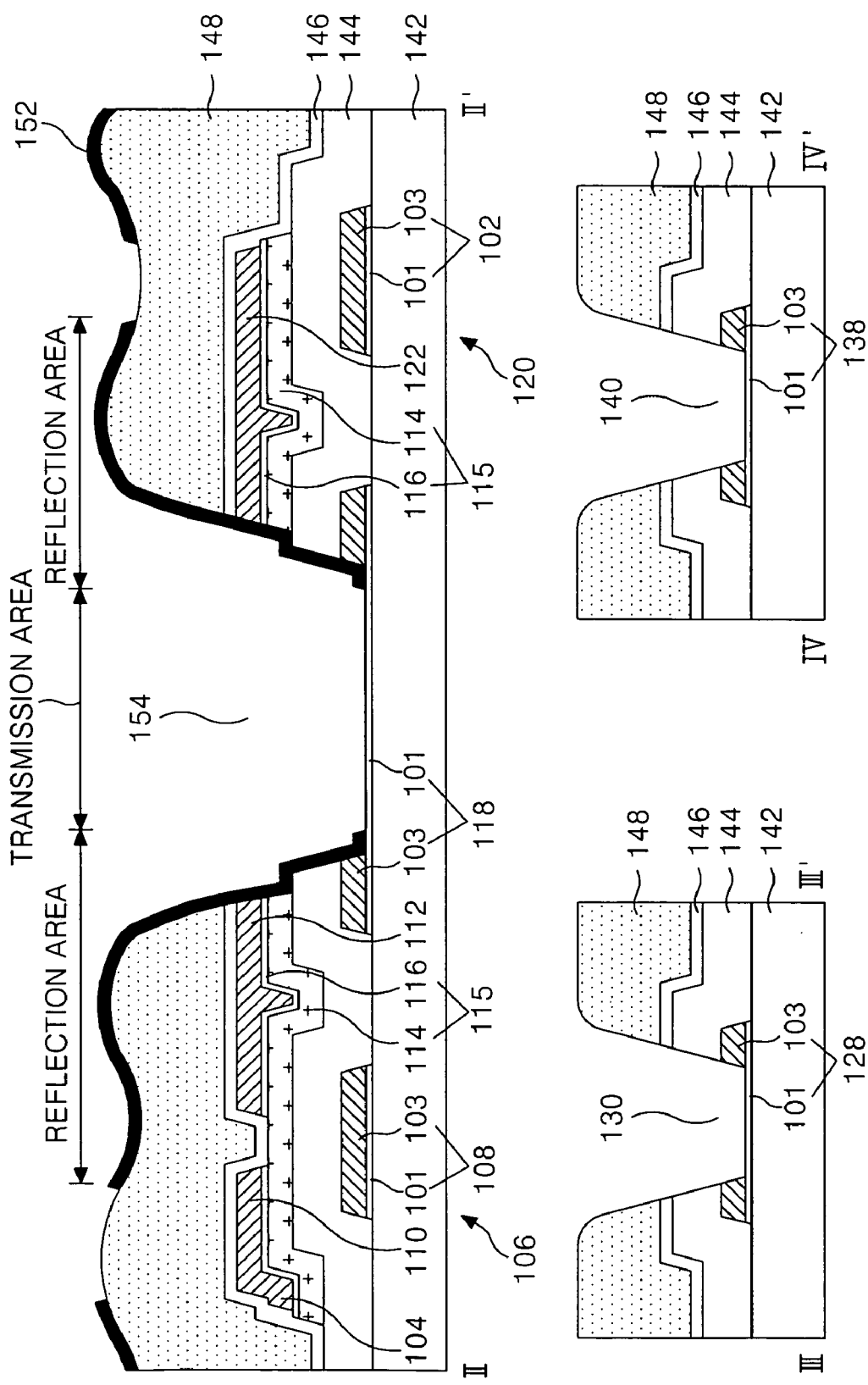

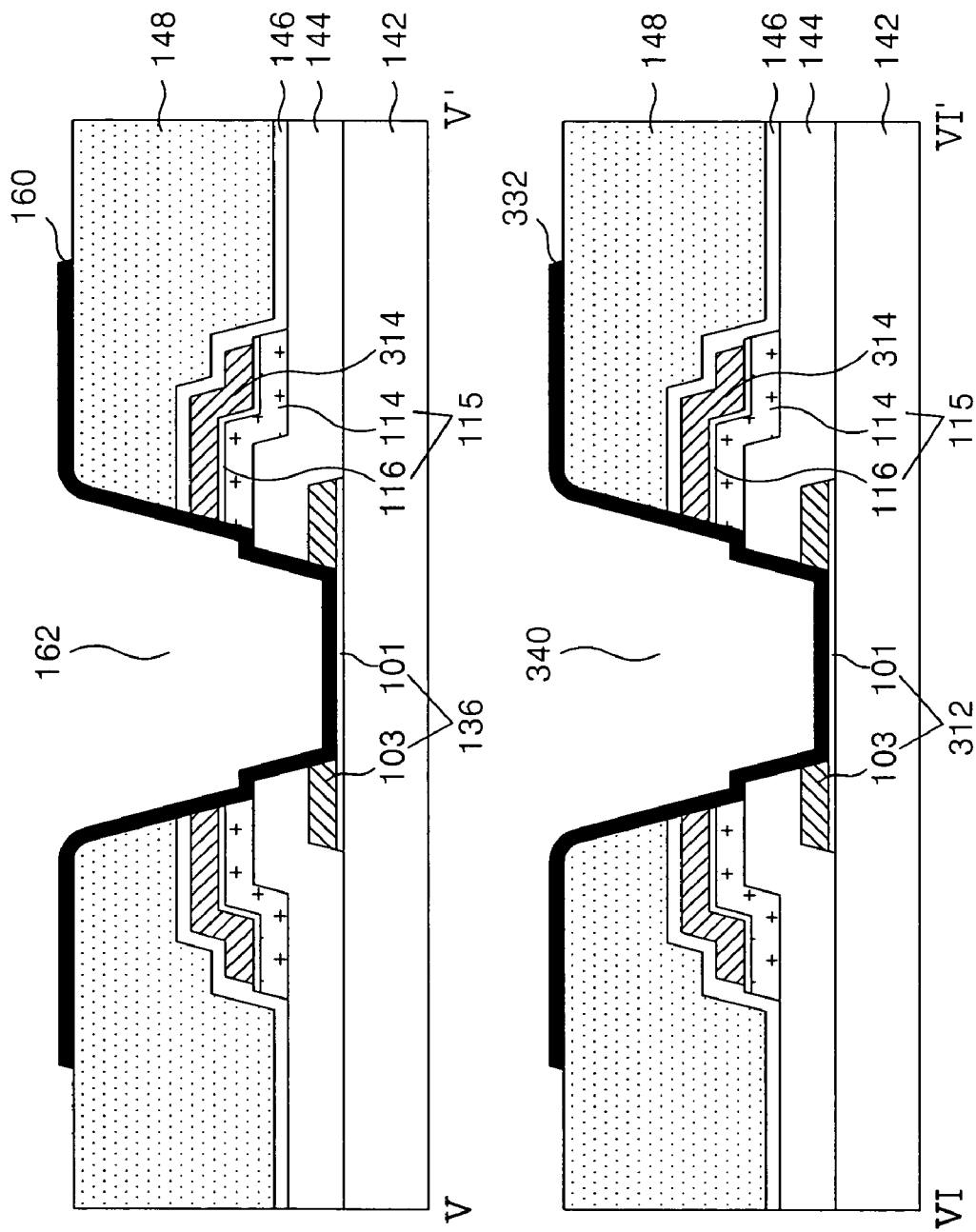

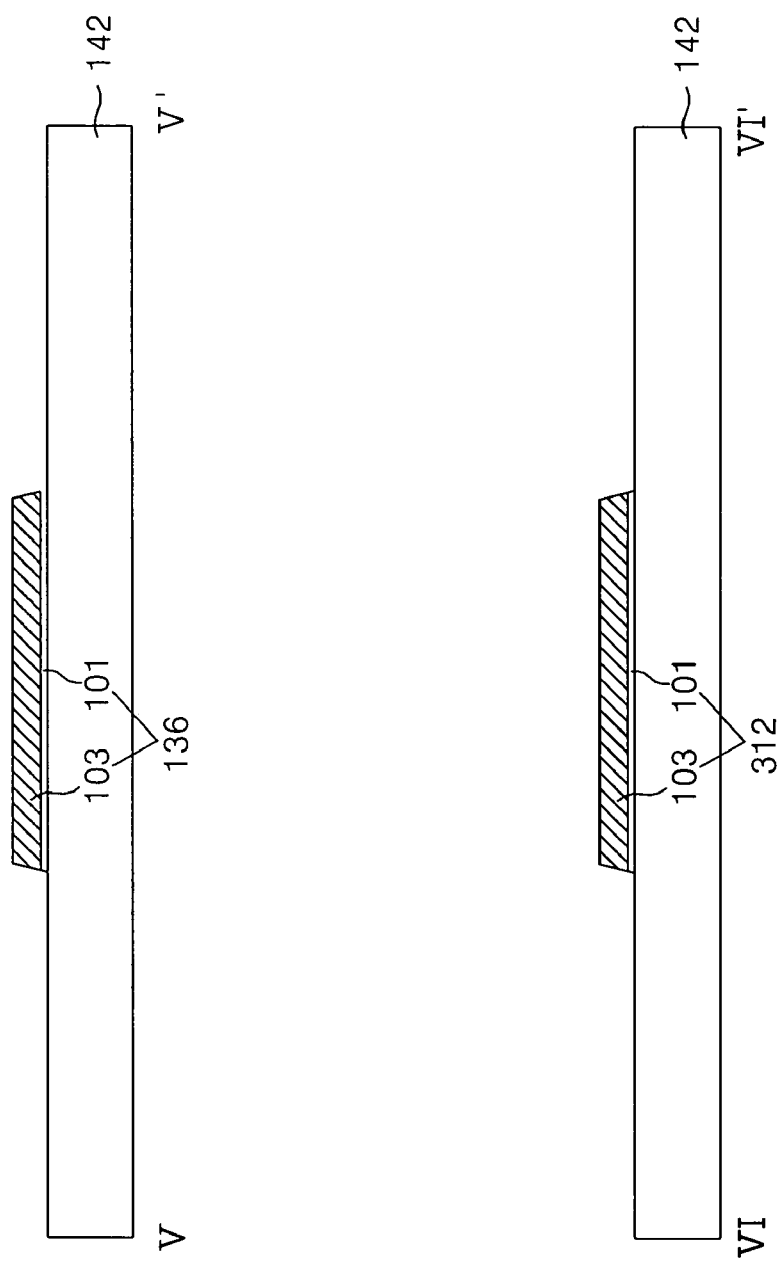

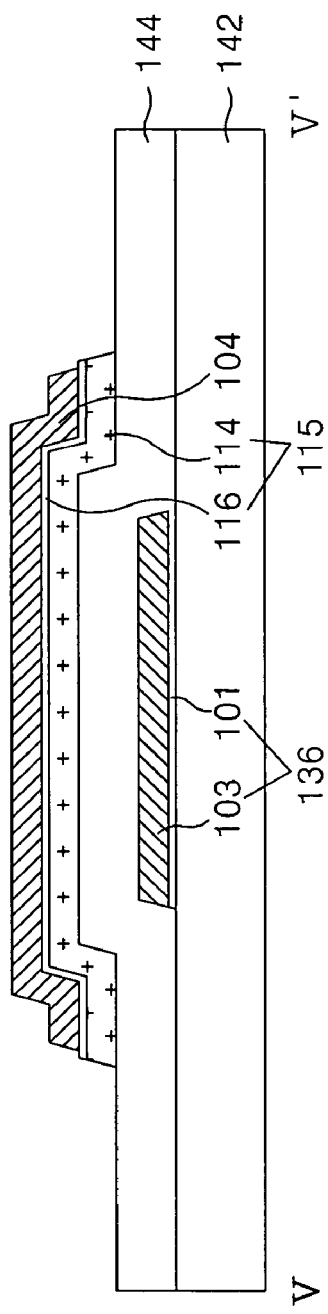
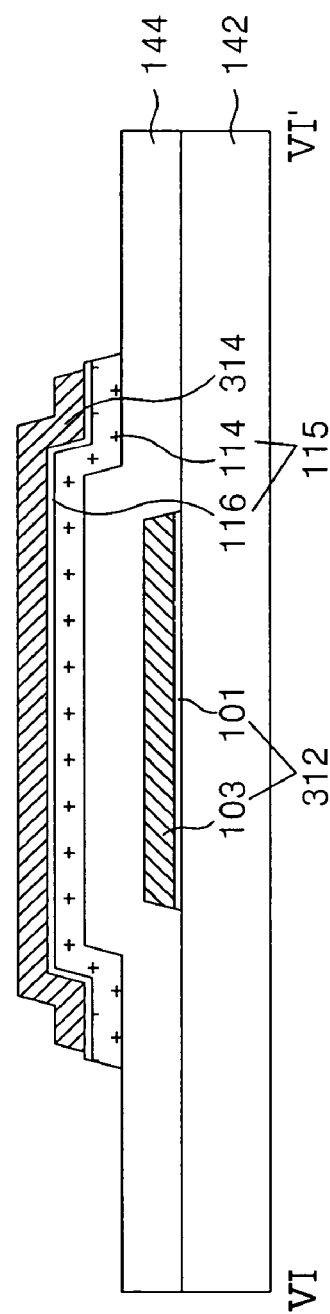
FIG.15B

FIG.16B
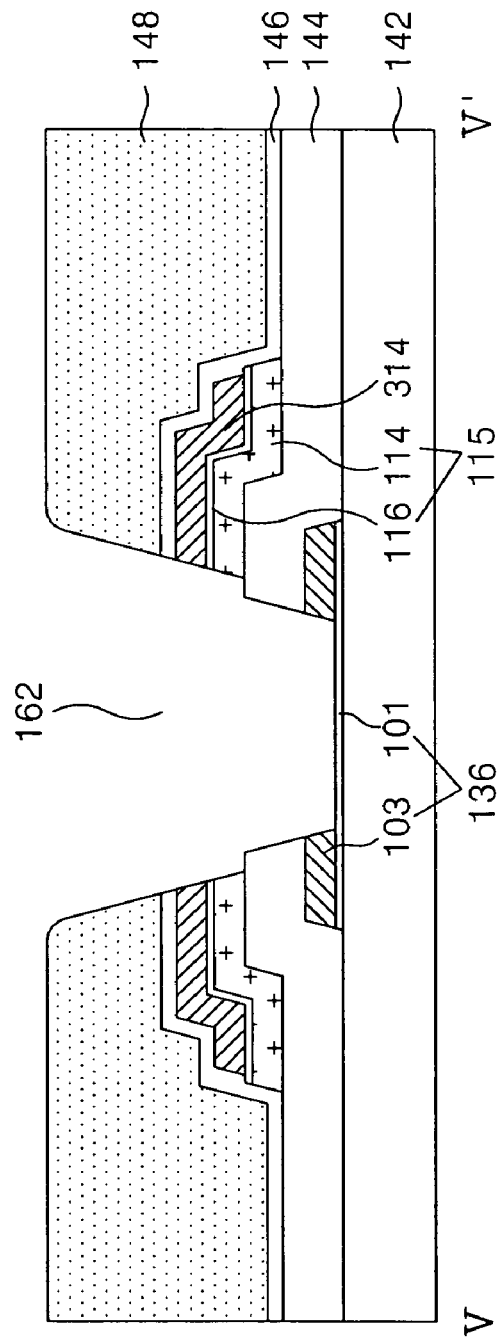
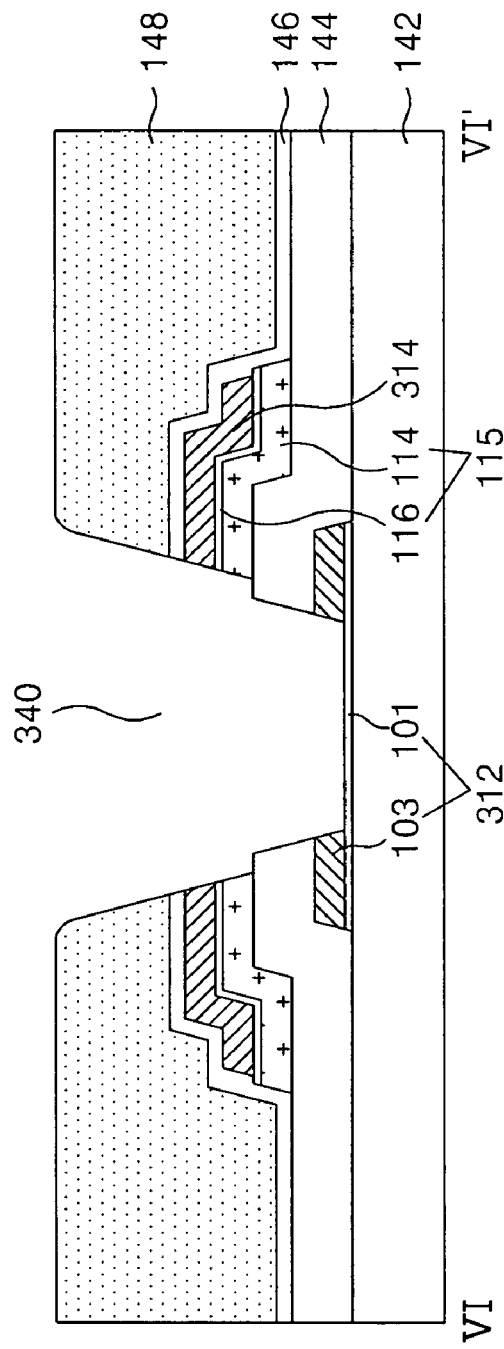

LIQUID CRYSTAL DISPLAY DEVICE AND FABRICATING METHOD HAVING REFLECTIVE ELECTRODE CONNECTING PIXEL ELECTRODE WITH DRAIN AND UPPER STORAGE CAPACITOR ELECTRODES AT EDGE OF TRANSMISSION HOLE

This application claims the benefit of Korean Patent Application No. P2004-41139, filed on Jun. 5, 2004, which is hereby incorporated by reference for all purposes as if fully set forth herein.

BACKGROUND OF THE INVENTION

1. Field of the Invention

The present invention relates to a transflective thin film transistor substrate of a liquid crystal display device, and more particularly, to a transflective thin film transistor substrate and method of fabricating the same that is adaptive for simplifying its process.

2. Discussion of the Related Art

In general, liquid crystal display (LCD) devices are classified into two types: the transmissive type in which images are displayed using light from a backlight unit, and the reflective type in which images are displayed using an external light such as a natural light. While the transmissive type has a disadvantage in that the power consumption of the backlight unit is high, the reflective type depends on the external light so that it cannot display images in a dark environment.

In order to solve such a problem, a transflective LCD device is being researched and manufactured. For the transflective LCD, either the transmissive mode where a backlight unit is used or the reflective mode where an external light is used can be selected. The transflective LCD device operates in the reflective mode when an external light is sufficient and operates in the transmissive mode when an external light is not sufficient. Thus, the transflective LCD can reduce power consumption compared with the transmissive LCD device without being dependent upon an external light.

Referring to FIG. 1, a transflective LCD panel according to the related art includes a color filter substrate and a thin film transistor substrate which are bonded together with a liquid crystal layer (not shown) between the two substrates. A backlight unit 60 is arranged behind the thin film transistor substrate. Each pixel of the transflective LCD panel is divided into a reflective area where a reflective electrode 28 is formed, and a transmissive area where the reflective electrode 28 is not formed.

The color filter substrate includes a black matrix (not shown), a color filter 54 formed on an upper substrate 52, a common electrode 56 and an alignment film (not shown) formed thereover.

The thin film transistor substrate includes a gate line 4 and a data line (not shown) formed on a lower substrate 2 to define each pixel area, a thin film transistor connected to the gate line 4 and the data line, a pixel electrode 32 formed at the pixel area and connected to the thin film transistor, and the reflective electrode 28 formed at a reflection area of each pixel to overlap the pixel electrode.

The thin film transistor includes a gate electrode 6 connected to the gate line 4, a source electrode 16 connected to the data line, a drain electrode 18 facing the source electrode 16, an active layer 10 that overlaps the gate electrode 6 with a gate insulating film 8 therebetween to form a channel between the source and drain electrodes 16 and 18, and an ohmic contact layer 12 to form an ohmic contact between the active layer 10 and the source and drain electrodes 16 and 18. The thin film transistor responds to a scan signal of the gate line 4 to charge a video signal in the pixel electrode 32 via the data line.

The reflective electrode 28 reflects an external light that is incident through a color filter substrate, toward the color filter substrate. The surface of an organic film 24 formed under the reflective electrode 28 has an embossed shape. Thus, the reflective electrode 28 has also an embossed surface, following the contours of the organic film 24, thereby increasing the reflection efficiency of the reflective electrode 28 due to the dispersion effect of the embossed surface.

The pixel electrode 32 is connected to the drain electrode of the thin film transistor, and the pixel electrode 32 supplied with a pixel signal through the thin film transistor generates a potential difference with respect to the common electrode 56. The potential difference causes a liquid crystal having a dielectric anisotropy to rotate, thereby controlling the transmissivity of the light that passes through the liquid crystal layer in each of the reflection area and a transmission area.

A transmission hole 36 is formed in the relatively thick organic film 24 at the transmission area so that a length of the light path passing through the liquid crystal layer in the reflection area is substantially the same as a length of the light path in the transmission area. In other words, the length of the light path that an ambient light being incident to the reflection area (reflection light RL) travels, i.e., the liquid crystal layer, the reflective electrode 28 and the liquid crystal layer is substantially the same as the length of the light path that the transmission light TL of the backlight unit 60, which is incident to the transmission area, travels. Thus, the transmission efficiency of the reflection mode becomes the same as that of the transmission mode.

The thin film transistor substrate further includes a storage capacitor connected to the pixel electrode 32 in order to stably maintain the video signal supplied to the pixel electrode 32. The storage capacitor is comprised of an upper storage electrode 20 and the gate line 4 with the gate insulating film 8 therebetween. The storage capacitor further includes the ohmic contact layer 12 and the active layer 10 between the upper storage electrode 20 and the gate line 4.

The thin film transistor substrate further includes a first passivation film 22 between the thin film transistor and the organic film 24, a second passivation film 26 between the organic film 24 and the reflective electrode 28, and a third passivation film 30 between the reflective electrode 28 and the pixel electrode 32. Accordingly, first and second contact holes 34 and 38 penetrate the first to third passivation films 22, 26 and 30, the organic film 24 and the reflective electrode 28, so that the pixel electrode 32 is connected to the upper storage electrode 20.

Because forming such a transflective LCD panel requires a plurality of mask processes, its manufacturing process is complicated and manufacturing cost increases.

Hereinafter, a method of fabricating a transflective thin film transistor substrate according to the related art will be described in reference with FIGS. 2A to 2F.

Referring to FIG. 2A, a gate pattern including the gate line 4 and the gate electrode 6 is formed on the lower substrate 2 using a first mask. To do so, a gate metal layer is formed on the lower substrate 2 by a deposition method such as sputtering. Subsequently, the gate metal layer is patterned by a photolithography process using the first mask and an etching process, thereby forming the gate pattern including the gate line 4 and the gate electrode 8. The gate metal layer is a single layer or double layer structure of metal such as Al, Mo, Cr or the like.

Referring to FIG. 2B, the gate insulating film 8 is formed on the substrate 2 where the gate pattern is formed, and a source/drain pattern is formed on the gate insulating film 8 using a second mask, which includes the data line, the source electrode 16, the drain electrode 18 and the upper storage electrode 20. To do so, the gate insulating film 8, an amorphous silicon layer, an amorphous silicon layer doped with impurities doped thereto, and a source/drain metal layer are sequentially formed on the lower substrate 2 where the gate pattern is formed. The gate insulating film 8 is formed of an inorganic insulating material such as silicon oxide SiOx or silicon nitride SiNx, and the source/drain metal layer is a single-layer or double-layer structure of metal such as Al, Mo, Cr, or the like.

A photo-resist pattern is formed on top of the source/drain metal layer by a photolithography process using the second mask. In this case, a diffractive exposure mask having a diffractive exposure part at a channel portion of the thin film transistor is used as the second mask, thus the photo-resist pattern of the channel portion has a lower height than the source/drain pattern portion.

Subsequently, the source/drain metal layer is patterned by a wet etching process using the photo resist pattern to form the source/drain pattern that includes the data line, the source electrode 16, the drain electrode 18 integrated with the source electrode 16, and the upper storage electrode 20.

Then, the amorphous silicon layer doped with the impurities and the amorphous silicon layer are simultaneously patterned by a dry etching process using the same photo-resist pattern, thereby forming the ohmic contact layer 12 and the active layer 10.

After removing the photo resist pattern having a relatively low height at the channel portion by an ashing process, the source/drain pattern and the ohmic contact layer 12 of the channel portion are etched by a dry etching process. Accordingly, the active layer 10 of the channel portion is exposed to separate the source electrode 16 from the drain electrode 18.

Subsequently, the photo-resist pattern remaining on the source/drain pattern is removed by a strip process.

Referring to FIG. 2C, the first passivation film 22 is formed on the gate insulating film 8 where the source/drain pattern is formed, and an organic film 24 is formed on top thereof using a third mask. With the third mask, first and second contact holes 35 and 37 and the transmission hole 36 with an embossed surface are formed in the organic film 24.

To do so, the first passivation film 22 and the organic film 24 are sequentially formed on the gate insulating film 8 where the source/drain pattern is formed. The first passivation film 22 is formed of, for example, the same inorganic insulating material as the gate insulating film 8, and the organic film 24 is formed of a photosensitive organic material such as acrylic resin.

And then, the organic film 24 is patterned by a photolithography process using the third mask, thereby forming the first and second contact holes 35 and 37 and the transmission hole 36 in the organic film 24. The third mask has a structure where a shielding part and a diffractive exposure part are repeated except for the area corresponding to the transmission part of the pixel area. Thus, the organic film 24 is patterned to have a structure where a projected part corresponding to the shielding area of the third mask and a groove part corresponding to the diffractive exposure area are repeated. Subsequently, the organic film 24 having an embossed shape is cured.

Referring to FIG. 2D, the second passivation film 26 is formed on the organic film 24 that has the embossed shape, and the reflective electrode 28 is formed on top thereof using a fourth mask.

To do so, the second passivation film 26 and a reflective metal layer are deposited, following the contours of the embossed shape of the organic film 24. The second passivation film 26 is formed of, for example, the inorganic insulating material such as the first passivation film 22, and the reflective metal layer is formed of metal such as AlNd or the like, of which the reflectivity is high.

Subsequently, the reflective metal layer is patterned by a photolithography process using a fourth mask and an etching process to form the reflective electrode 28. the reflective electrode has openings at the transmission hole 36 and the first and second open holes 35 and 37 of the organic film 24 in each pixel area.

Referring to FIG. 2E, the third passivation film 30 covering the reflective electrode 28 is formed using a fifth mask. With the fifth mask, first and second contact holes 34 and 38 penetrating the first to third passivation films 22, 26 and 30 are formed.

To do so, the third passivation film 30 covering the reflective electrode 28 is formed on top of the reflective electrode 28. Then, the first and second contact holes 34 and 38 are formed by a photolithography process and an etching process using the fifth mask. Because the first and second contact holes 34 and 38 penetrate the first to third passivation films 22, 26 and 30, the first and second contact holes 34 and 38 expose the drain electrode 18 and the upper storage electrode 20. The third passivation film 30 is formed of, for example, the same inorganic insulating material as the second passivation film 26.

Referring to FIG. 2F, the pixel electrode 32 is formed on the third passivation film 30 using a sixth mask.

To do so, a transparent conductive layer is formed on the third passivation film 30 by a deposition method such as sputtering. Then, the transparent conductive layer is patterned by a photolithography process and an etching process using the sixth mask to form the pixel electrode 32 in each pixel area. The pixel electrode 32 is connected to the drain electrode 18 and the upper storage electrode 20 through the first and second contact holes 34 and 38. The transparent conductive layer is formed of, for example, indium-tin-oxide ITO.

As described above, the related art transflective thin film transistor substrate is fabricated using six masks so that its manufacturing process is complicated. Further, a sufficient process margin of the first and second contact holes 34, 38 should be secured in order for the pixel electrode 32 to be connected to the drain electrode 18 and the upper storage electrode 20, thereby reducing the aperture ratio of the transmission area.

SUMMARY OF THE INVENTION

Accordingly, the present invention is directed to a transflective thin film transistor substrate and method of fabricating the same that substantially obviates one or more of the problems due to limitations and disadvantages of the related art.

An advantage of the present invention is to provide a transflective thin film transistor substrate that is adaptive for simplifying its process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates; a gate line having a double-layer structure including a first transparent conductive layer and a second opaque conductive layer on the first substrate; a first insulation film on the gate line; a data line crossing the gate line to define a pixel region, the pixel region having a transmission area and a reflection area; a thin film transistor connected to the gate and data lines; a pixel electrode having the first transparent conductive layer and the second opaque conductive layer along a boundary of the first transparent conductive layer; a upper storage electrode over the gate line with the gate insulating film therebetween for forming a storage capacitor; a transmission hole passing through the second opaque conductive layer of the pixel electrode from a second insulation film to expose the first transparent conductive layer of the pixel electrode; a reflective electrode in the reflection area, the reflective electrode connecting the pixel electrode with a drain electrode and the upper storage electrode near an edge of the transmission hole; a gate pad extended from the gate line, the gate pad including the first transparent conductive layer exposed through a first pad contact hole, the first pad contact hole passing through the second insulation film to the second opaque conductive layer; a data pad connected to the data line via a data link, the data pad including the first transparent conductive layer exposed through a second pad contact hole, the second pad contact hole passing through the second insulation film to the second opaque conductive layer; and a liquid crystal layer between the first and second substrates.

A method of fabricating a liquid crystal display device according to an embodiment of the present invention includes providing first and second substrates; forming a gate line, a gate electrode, and a pixel electrode having a double-layer structure on the first substrate using a first mask, the double-layer structure including a first transparent conductive layer and a second opaque conductive layer; forming a first insulation film, a semiconductor pattern on the first insulation film, a source/drain pattern having an upper storage electrode, a drain electrode, a source electrode, a data line using a second mask, the data and gate lines defining a pixel region having a transmission area and a reflection area; forming a second insulation film on the source/drain pattern and a transmission hole by passing through the second insulation film to the second opaque conductive layer of the pixel electrode in the transmission area using a third mask; and forming a reflective electrode in the reflection area using a fourth mask, the reflective electrode connecting the pixel electrode with the drain electrode and the storage electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a cross-sectional view illustrating the transflective thin film transistor substrate taken along the lines II-II', III-III', IV-IV' shown in FIG. 3;

FIGS. 5A and 5B are a plane view and a cross-sectional view illustrating a first mask process of the transflective thin film transistor substrate according to the embodiment of the present invention;

FIGS. 6A and 6B are a plane view and a cross-sectional view illustrating a second mask process of the transflective thin film transistor substrate according to the embodiment of the present invention;

FIGS. 7A and 7E are cross-sectional views illustrating the second mask process of the present invention in detail;

FIGS. 9A and 9D are cross-sectional views illustrating the third mask process of the present invention in detail;

FIGS. 10A and 10B are a plane view and a cross-sectional view illustrating a fourth mask process of the transflective thin film transistor substrate according to the embodiment of the present invention;

FIG. 13 is a cross-sectional view illustrating the transflective thin film transistor substrate taken along the lines V-V' and VI-VI' shown in FIG. 12;

FIGS. 14A and 14B are a plane view and a cross-sectional view illustrating a first mask process of the transflective thin film transistor substrate shown in FIG. 13;

FIGS. 15A and 15B are a plane view and a cross-sectional view illustrating a second mask process of the transflective thin film transistor substrate in FIG. 13;

FIGS. 16A and 16B are a plane view and a cross-sectional view illustrating a third mask process of the transflective thin film transistor substrate in FIG. 13.

DETAILED DESCRIPTION OF THE ILLUSTRATED EMBODIMENT

Reference will now be made in detail to embodiments of the present invention, examples of which are illustrated in the accompanying drawings. The same reference numbers may be used throughout the drawings to refer to the same or like parts.

Figure 1:
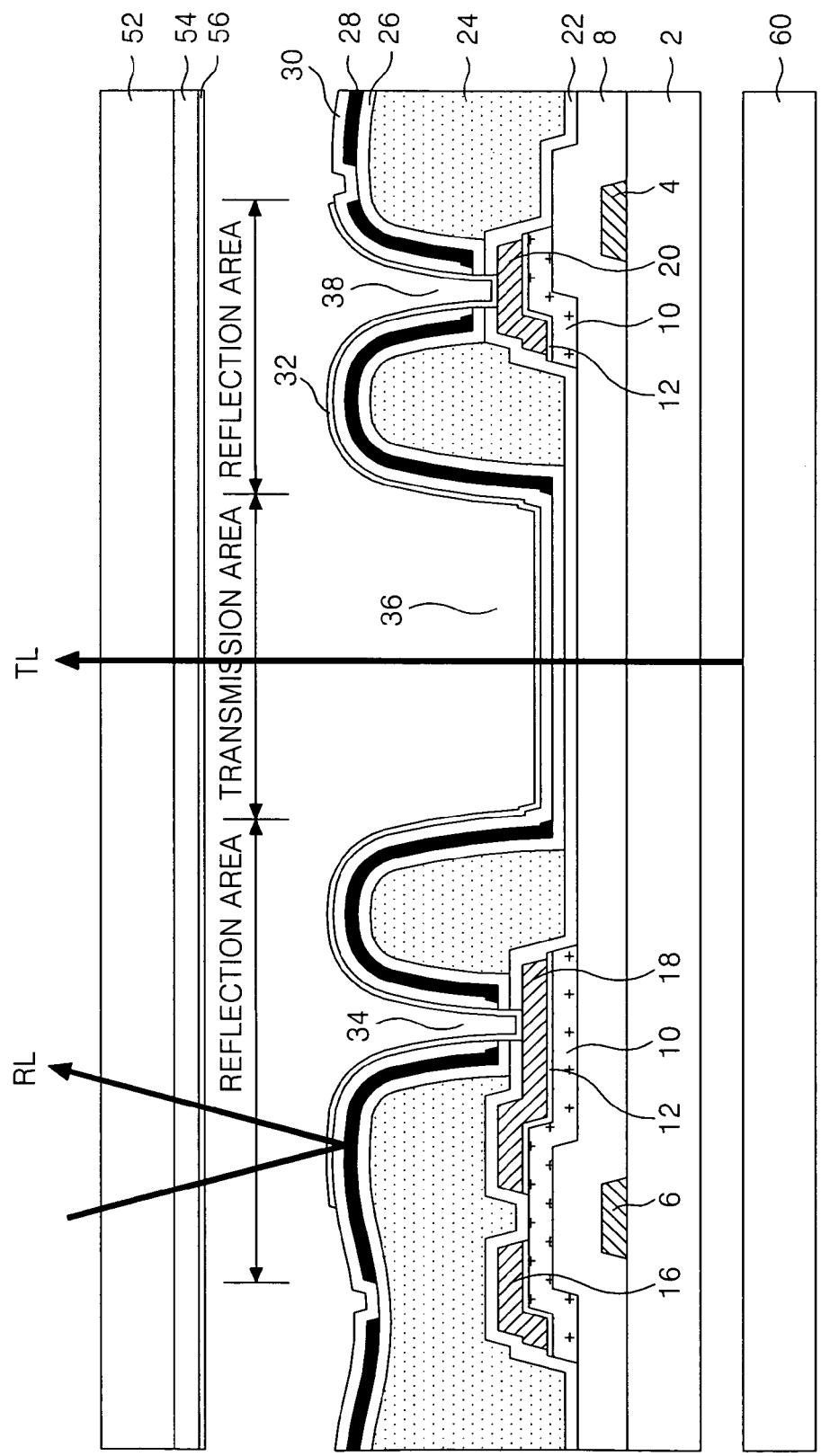
FIG. 1 is a cross-sectional view illustrating a transflective liquid crystal display panel according to the related art.
Figure 2A:
FIGS. 2A to 2F are cross-sectional views illustrating a method of fabricating the transflective thin film transistor substrate illustrated in FIG. 1.
Figure 2B:
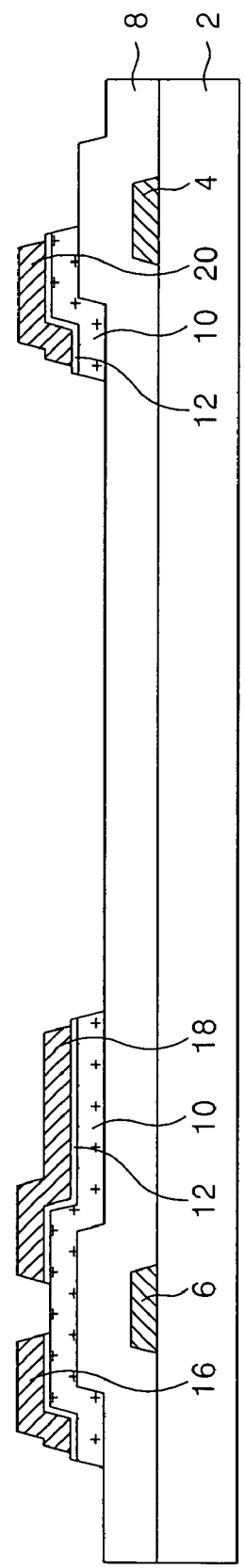
Figure 2C:
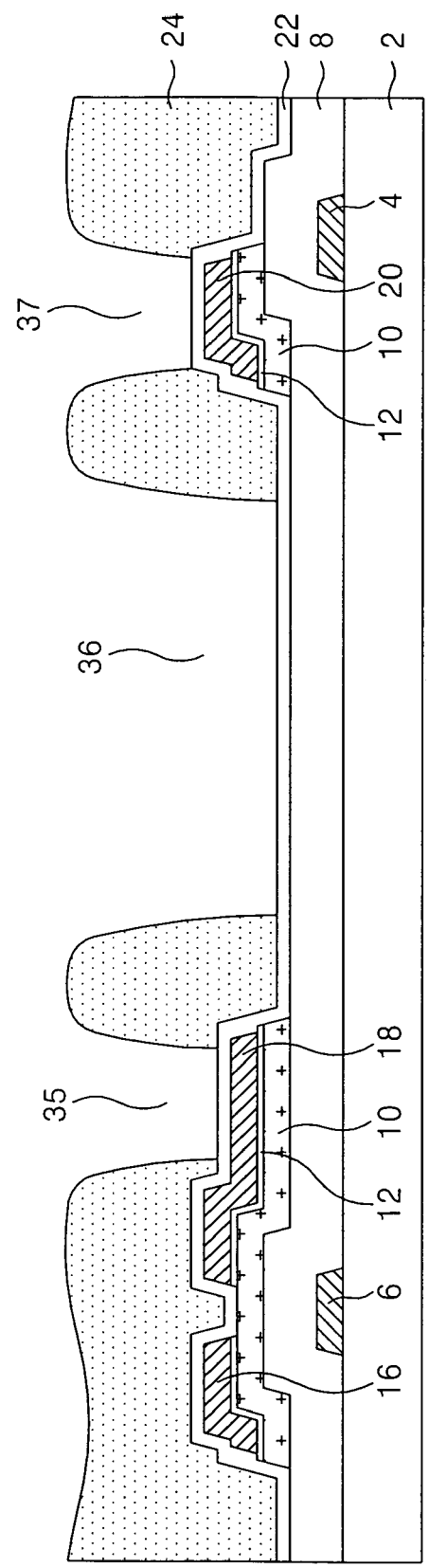
Figure 2D:
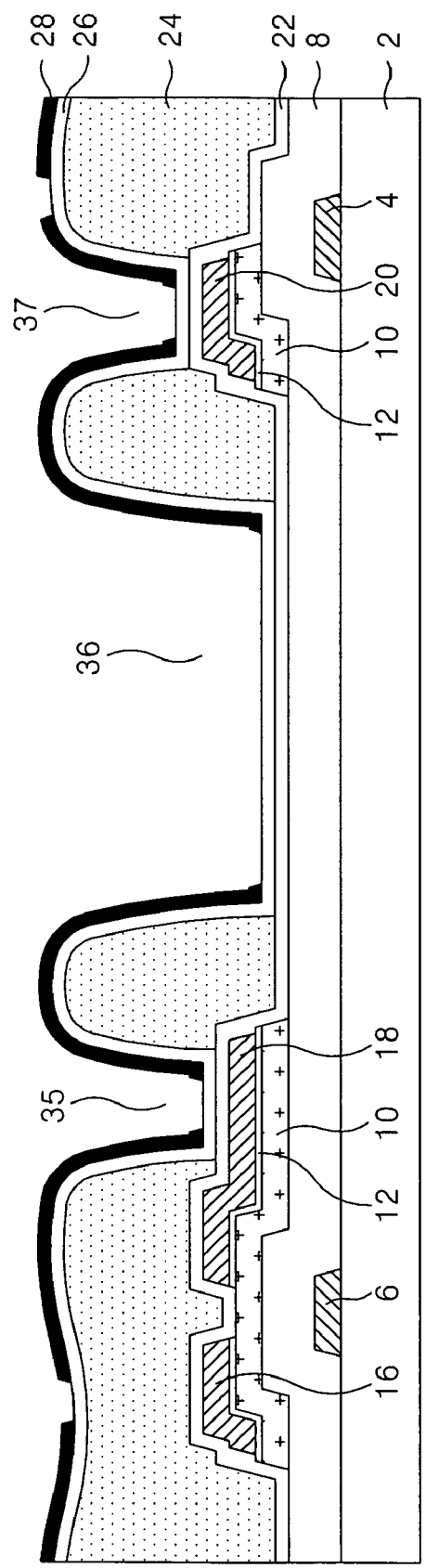
Figure 2E:
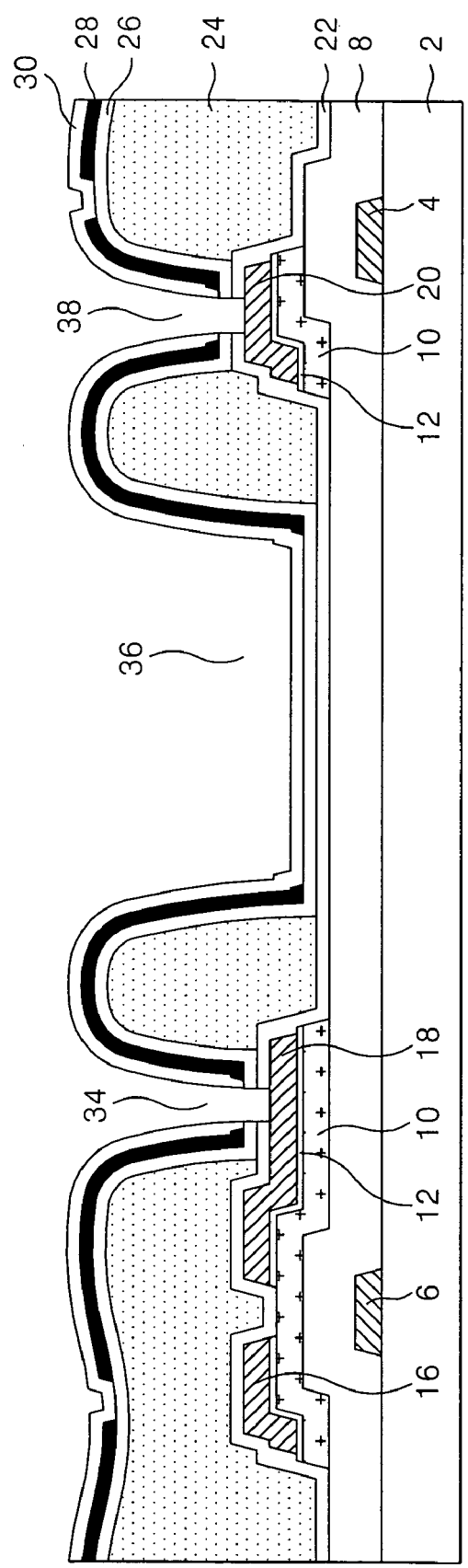
Figure 2F:
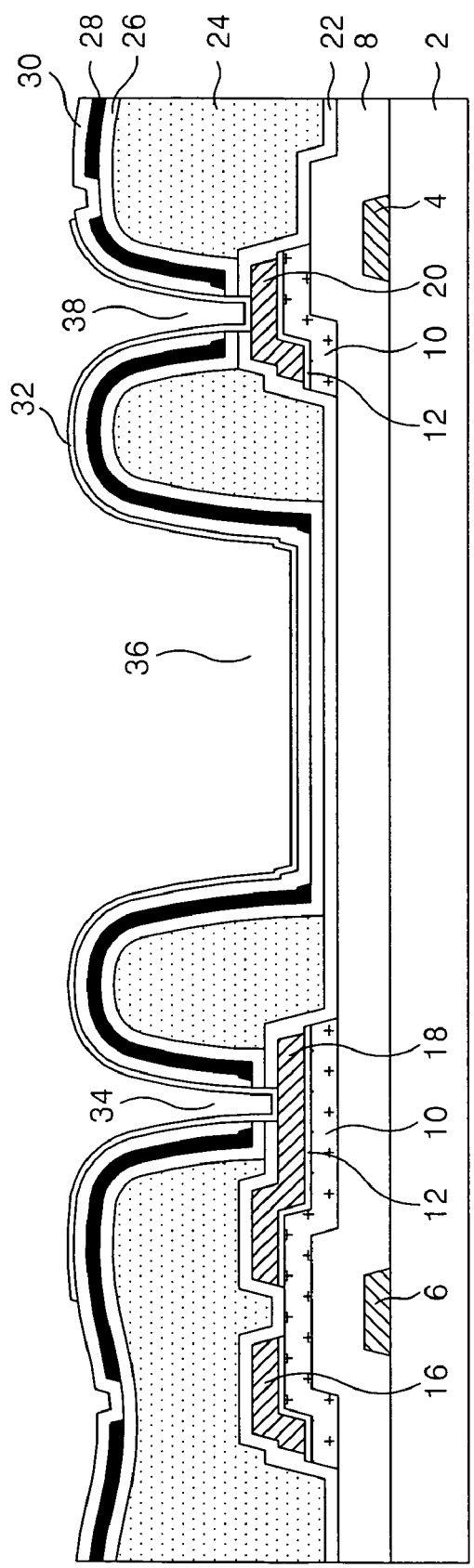
Figure 3:
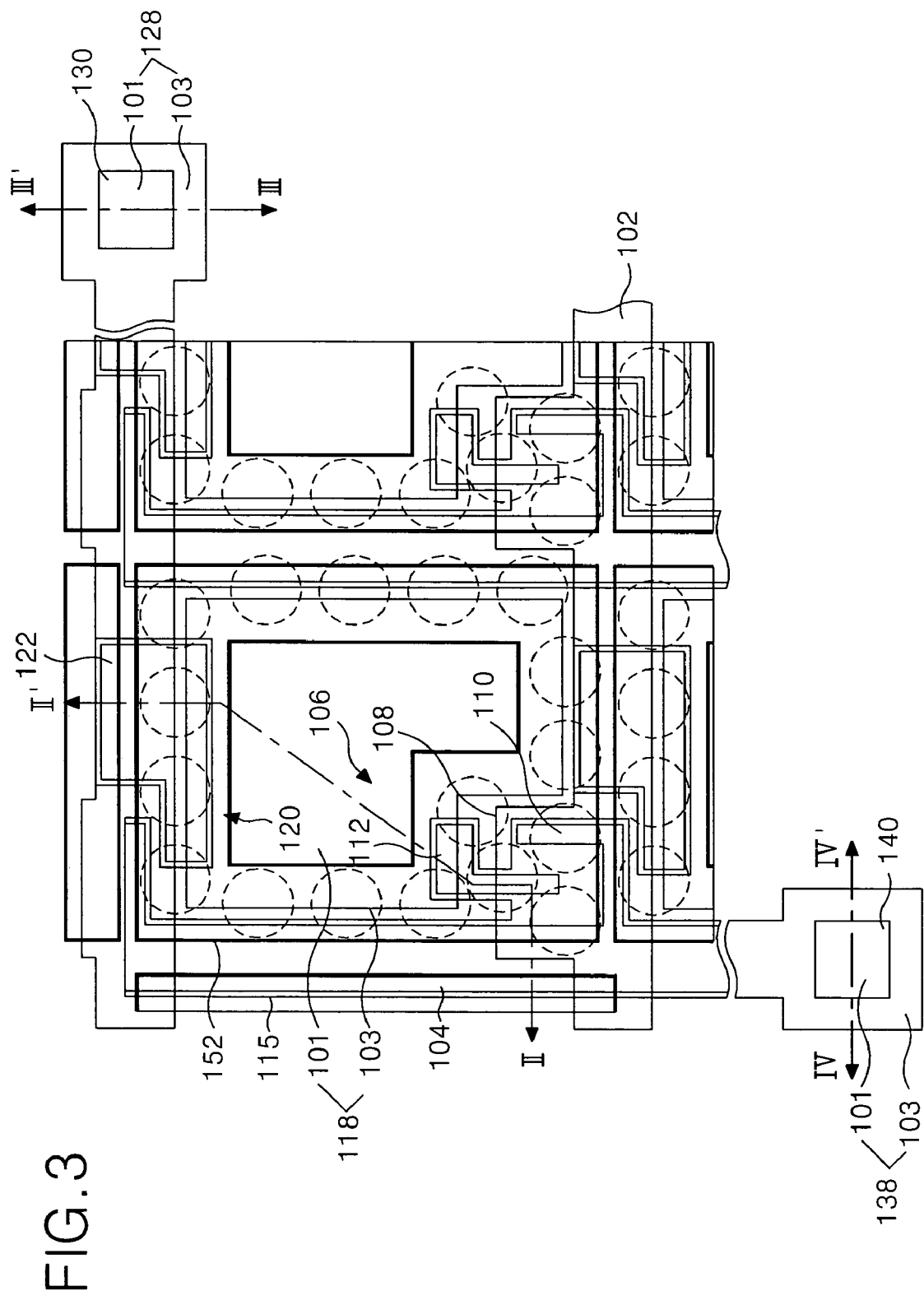
FIG. 3 is a plane view illustrating a transflective thin film transistor substrate according to an embodiment of the present invention.

An embodiment of the present invention will be described in detail with reference to FIGS. 3 to 17B. FIG. 3 is a plane view illustrating a transflective thin film transistor substrate according to an embodiment of the present invention, and FIG. 4 is a cross-sectional view illustrating the transflective thin film transistor substrate taken along the lines II-II', III-III', IV-IV' shown in FIG. 3.

Referring to FIGS. 3 and 4, the transflective thin film transistor substrate includes a gate line 102 and a data line 104 that cross each other to define a pixel area on a lower substrate 142 with a gate insulating film 144 therebetween, a thin film transistor 106 connected to the gate line 102 and the data line 104, a reflective electrode 152 formed at a reflection area of each pixel, and a pixel electrode 118 formed at each pixel area and connected to the thin film transistor 106 through the reflective electrode 152.

The transflective thin film transistor substrate further includes a storage capacitor 120 that is formed by the overlapping of the previous gate line 102 and an upper storage electrode 122 connected to the pixel electrode 118 through the reflective electrode 152, a gate pad 128 connected to the gate line 102, and a data pad 138 connected to the data line 104. The transflective thin film transistor substrate divides each pixel area into a reflection area where the reflective electrode 152 is formed and a transmission area where the reflective electrode 152 is not formed.

The thin film transistor 106 include a gate electrode 108 connected to the gate line 102, a source electrode 110 connected to the data line 104, a drain electrode 112 facing the source electrode 110 and connected to the pixel electrode 118, an active layer 114 that overlaps the gate electrode 108 with the gate insulating film 144 therebetween to form a channel between the source electrode 110 and the drain electrodes 112, and an ohmic contact layer 116 formed on the active layer 114 except for a channel portion to form an ohmic contact between the source and drain electrodes 110 and the active layer 114. The thin film transistor 106 responds to a scan signal of the gate line 102 to charge a video signal in the pixel electrode 118 via the data line 104.

The gate line 102 and the gate electrode 108 has a double-layer structure that has a first conductive layer 101 of a transparent conductive layer and a second conductive layer 103 of a metal layer on top of the first conductive layer 101.

A semiconductor pattern 115 including the active layer 114 and the ohmic contact layer 116 overlaps the data line 104.

The reflective electrode 152 is formed at the reflection area of each pixel to reflect an external light. The reflective electrode 152 has an embossed shape in accordance with a surface contour of an organic film 148 to increase its reflection efficiency due to dispersion effect.

The pixel electrode 118 is formed at each pixel area and is connected to the drain electrode 112 through the reflective electrode 152 located at an edge of a transmission hole 154. The pixel electrode 118 has a double-layer structure where the first and second conductive layers 101 and 103 are deposited as the gate line 102, and the first conductive layer 101 at the transmission area is exposed through the transmission hole 154. The pixel electrode 118 supplied with a pixel signal through the thin film transistor generates a potential difference with respect to a common electrode of a color filter substrate (not shown). The potential difference causes a liquid crystal having a dielectric anisotropy to rotate, thereby controlling the transmissivity of the light that passes through the liquid crystal layer in each of the reflection area and the transmission area.

The transmission hole 154 at the transmission area is formed to penetrate a gate insulating film 144 on the pixel electrode 118, and a passivation film 146, an organic film 148 on the thin film transistor 106. Accordingly, a length of the light path passing through the liquid crystal layer in the reflection area is substantially the same as a length of the light path in the transmission area. Thus, a transmission efficiency of the reflection mode becomes substantially the same as that of the transmission mode.

The upper storage electrode 122 connected to the pixel electrode 118 overlaps the previous state gate line 102 with the gate insulating film 144 therebetween, thereby forming the storage capacitor 120. The upper storage electrode 122 is connected to the pixel electrode 118 through the reflective electrode 152 located at an edge of the transmission hole 154. The upper storage electrode 122 further overlaps the semiconductor pattern 115 including the active layer 114 and the ohmic contact layer 116.

The gate line 102 is connected to a gate driver (not shown) through the gate pad 128. The first and second conductive layers 101 and 103 of the gate line 102 are extended to form the gate pad 128, and the first conductive layer 101 is exposed through a first contact hole 130 that penetrates the layers from the organic film 148 to the second conductive layer 103.

The data line 104 is connected to a data driver (not shown) through the data pad 138. The data pad 138 has a double-layer structure where the first and second conductive layers 101 and 103 are deposited as the gate pad 128, and the first conductive layer 101 is exposed through the second contact hole 140 that penetrates the layers from the organic layer 148 to the second conductive layer 103. The data pad 138 is connected to the data line 104 through a separate contact electrode (not shown).

As described above, the transflective thin film transistor substrate according to the embodiment of the present invention has the pixel electrode 118 connected to the drain electrode 112 and the upper storage electrode 122 through the reflective electrode 152 located at an edge of the transmission hole 154. Accordingly, it is not required to have a separate contact hole for connecting the pixel electrode 118 with the drain electrode 112 and the upper storage electrode 122, thereby increasing the aperture ratio of the transmission area.

In addition, the reflective electrode 152 is connected to both the first and second conductive layers 101 and 103 of the pixel electrode 118. Accordingly, when AlNd is used for the reflective electrode 152, ITO is used for the first conductive layer 101 of the pixel electrode 118 and Mo is used for the second conductive layer 103, generation of $Al_2O_3$, which increases contact resistance, can be minimized or prevented because AlNd and ITO are connected through Mo.

The thin film transistor according to the embodiment of the present invention can be, for example, formed by the following four mask process.

Figure 5A:
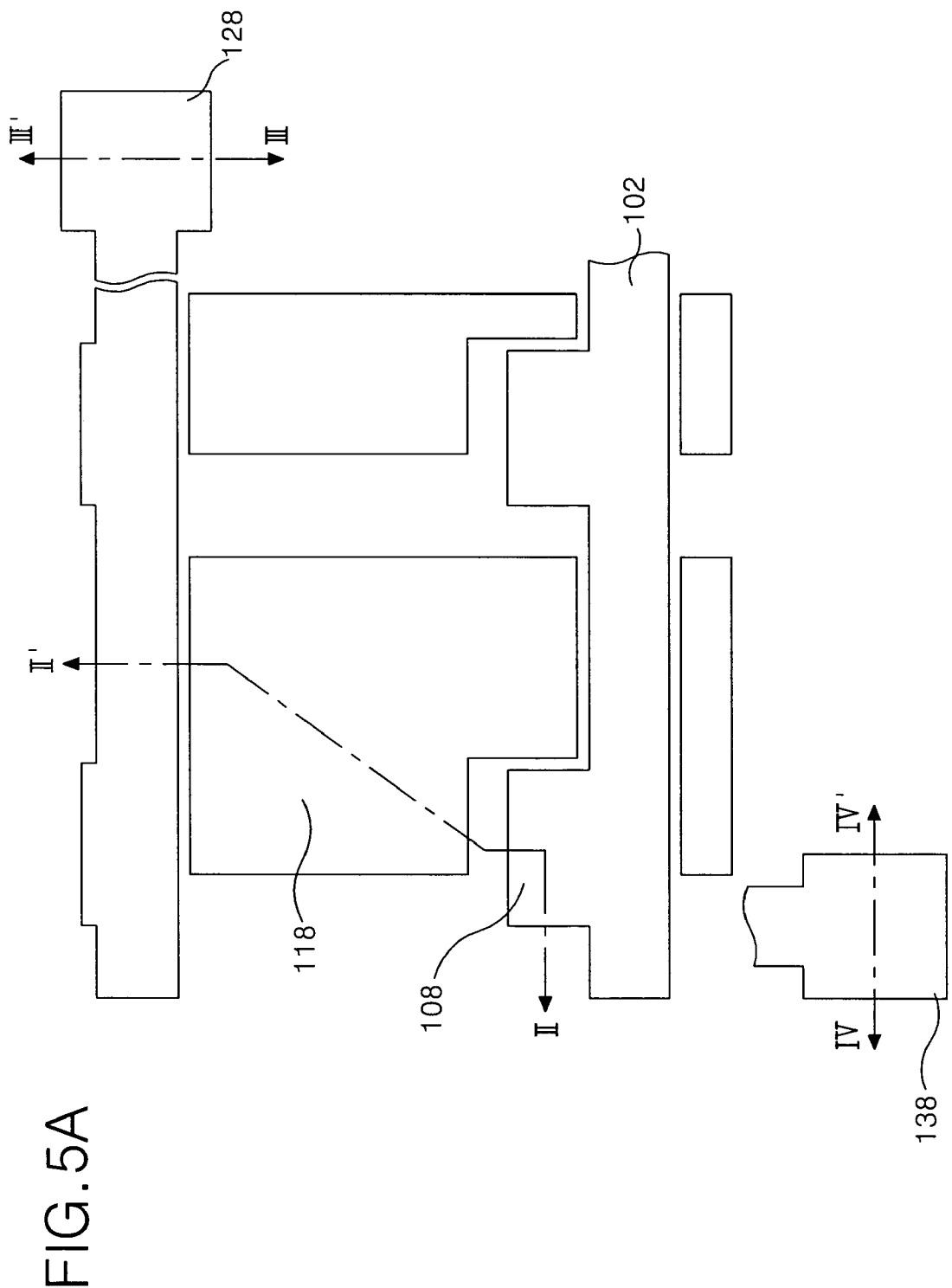

FIGS. 5A and 5B are a plane view and a cross-sectional view illustrating a first mask process in a fabricating method of the transflective thin film transistor substrate according to the embodiment of the present invention.

A gate pattern is formed by a first mask process, wherein the gate pattern includes the gate line 102, the gate electrode 108 and the gate pad connected to the gate line 102, the data pad 138 and the pixel electrode 118 on the lower substrate 142. The gate pattern is formed with a double-layer structure that has the first and second conductive layers 101 and 103.

Specifically, the first and second conductive layers 101 and 103 are deposited on the lower substrate 142 by a deposition method such as sputtering. The deposited first and second conductive layers 101 and 103 are patterned by a photolithography process using a first mask and an etching process, thereby forming the gate pattern that includes the gate line 102, the gate electrode 108, the gate pad 128, the data pad 138 and the pixel electrode 118. The first conductive layer 101 is formed of a transparent conductive material such as ITO, TO, IZO or the like, and the second conductive layer 103 is formed of a metal material such as Mo, Cu, Al(Nd), Cr, Ti and so on.

Figure 6A:
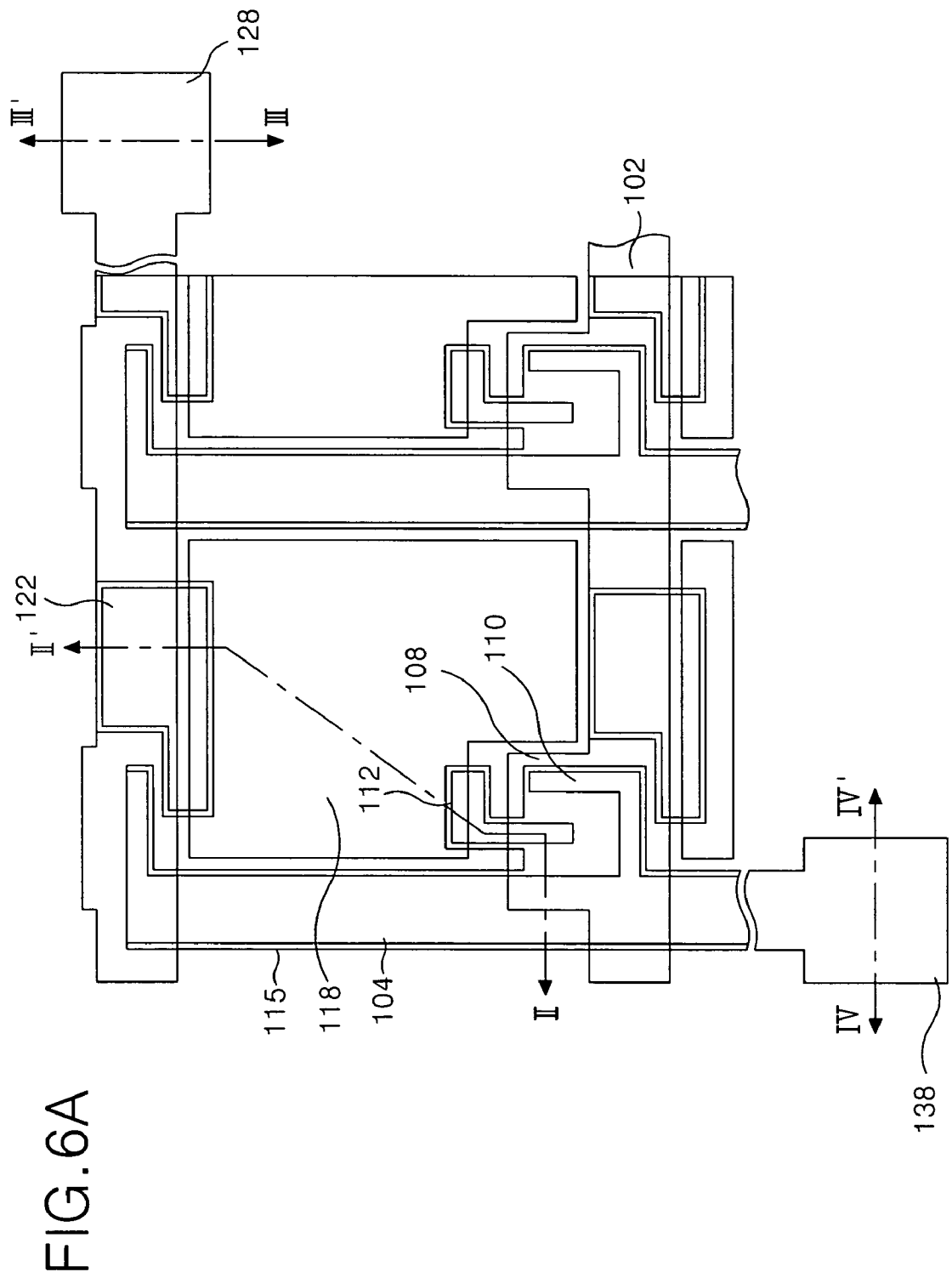

FIGS. 6A and 6B are a plane view and a cross-sectional view illustrating a second mask process in a fabricating method of the transflective thin film transistor substrate according to the embodiment of the present invention, and FIGS. 7A to 7E are cross-sectional views illustrating the second mask process in detail.

The gate insulating film 144 is formed on the lower substrate 142 where the gate pattern is formed. A source/drain pattern including the data line 104, the source electrode 110, the drain electrode 112 and the upper storage electrode 122, and a semiconductor pattern 115 including the active layer 114 and the ohmic contact layer 116 are formed by a second mask process. The semiconductor pattern 115 and the source/drain pattern are formed by a single mask process using a diffractive exposure mask.

Specifically, the gate insulating film 144, an amorphous silicon layer 105, an amorphous silicon layer 107 doped with impurities n+ or p+, a source/drain metal layer 109 are sequentially formed on the lower substrate 142 where the gate pattern is formed, as illustrated in FIG. 7A. For example, the gate insulating film 144, the amorphous silicon layer 105, the amorphous silicon layer 107 doped with impurities are formed by PECVD, and the source/drain metal layer 109 is formed by sputtering. The gate insulating film 144 is formed of an inorganic insulating material such as silicon oxide SiOx, silicon nitride SiNx, and the source/drain metal layer 109 is formed of Cr, Mo, MoW, Al/Cr, Cu, Al(Nd), Al/Mo, Al(Nd)/Al, Al(Nd)/Cr, Mo/Al(Nd)/Mo, Cu/Mo, Ti/Al(Nd)/Ti and so on. As an example of the double-layer structure, in case of Al/Cr, an Al layer is formed after a Cr layer is formed.

A photo-resist 219 is spread over the source/drain metal layer 109, and then the photo-resist 219 is exposed and developed by a photolithography process using a diffractive exposure mask 210, thereby forming a photo-resist pattern 220 with differences in thickness, as illustrated in FIG. 7B.

The diffractive exposure mask 210 includes a transparent quartz substrate 212, a shielding layer 214 formed of a metal layer such as Cr, CrOx or the like on top thereof, and a diffractive exposure slit 216. The shielding layer 214 is located at an area where the semiconductor pattern and the source/drain pattern are to be formed, to intercept ultraviolet ray, thereby leaving a first photo-resist pattern 220A after a development process. The diffractive exposure slit 216 is located at an area where the channel of the thin film transistor is to be formed, to diffract the ultraviolet ray, thereby leaving a second photo resist pattern 220B that is thinner than the first photo resist pattern 220A after the development process.

Subsequently, the source/drain metal layer 109 is patterned by an etching process using the photo resist pattern 220, thereby forming the source/drain pattern and the semiconductor pattern 115 thereunder, as illustrated in FIG. 7C. In this case, the source electrode 110 is connected to the drain electrode 112 in the source/drain pattern.

Then, an ashing process is performed on the photo resist pattern 220 using oxygen $O_2$ plasma, so that the first photo resist pattern 220A becomes thinner and the second photo resist pattern 220B is removed, as illustrated in FIG. 7D. And, the source/drain pattern exposed by the removal of the second photo resist pattern 220B and the ohmic contact layer 116 thereunder are eliminated by an etching process using the ashed first photo resist pattern 220A as a mask, thereby separating the source electrode 110 from the drain electrode 112 and exposing the active layer 114. Accordingly, a channel of the active layer 114 is formed between the source electrode 110 and the drain electrode 112. At this moment, both sides of the source/drain pattern are etched once more along the ashed first photo resist pattern 220A. Thus, the source/drain pattern and the semiconductor pattern 115 have a step shape, as illustrated in FIG. 7D.

Figure 7E:
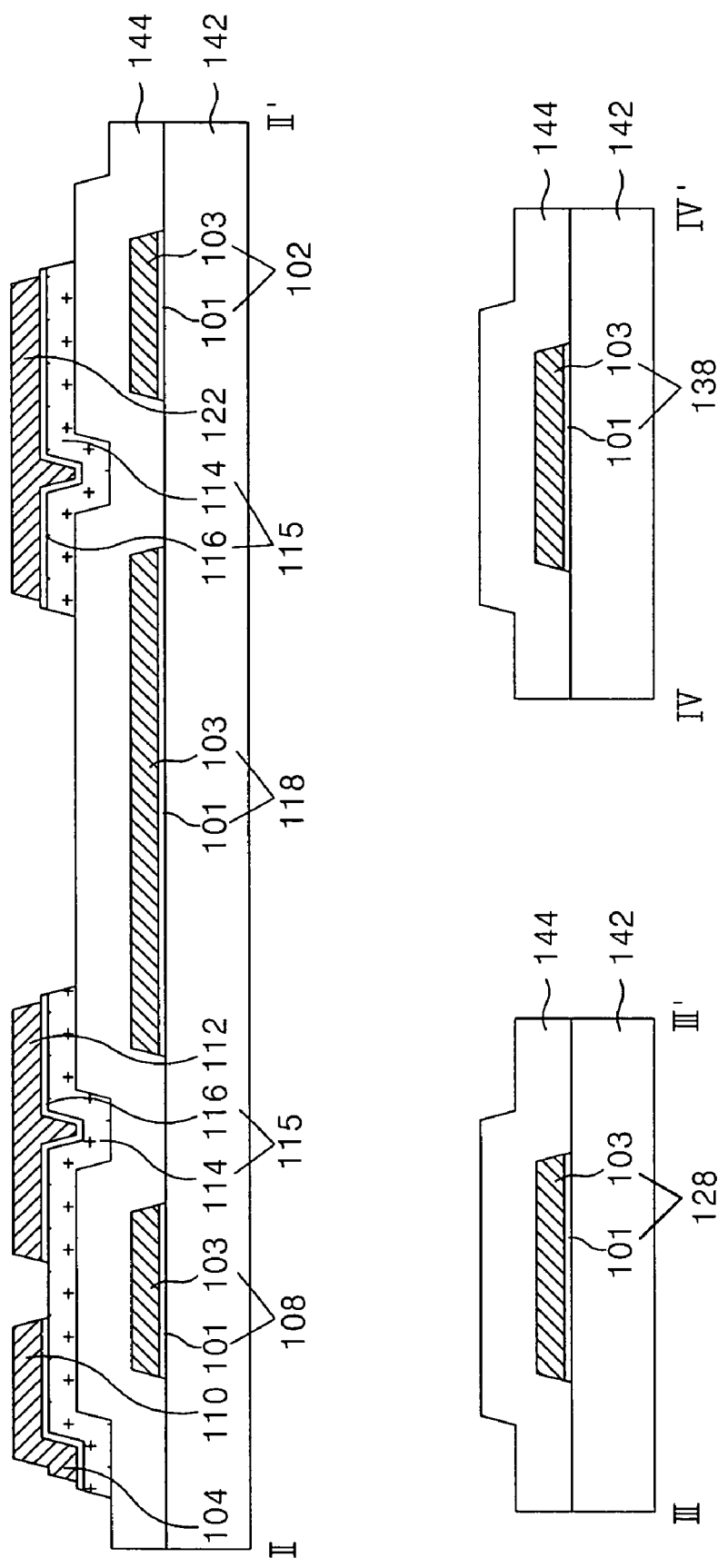

Then, the first photo resist pattern 220A remaining on the source/drain pattern is removed by a strip process, as illustrated in FIG. 7E.

Figure 8A:
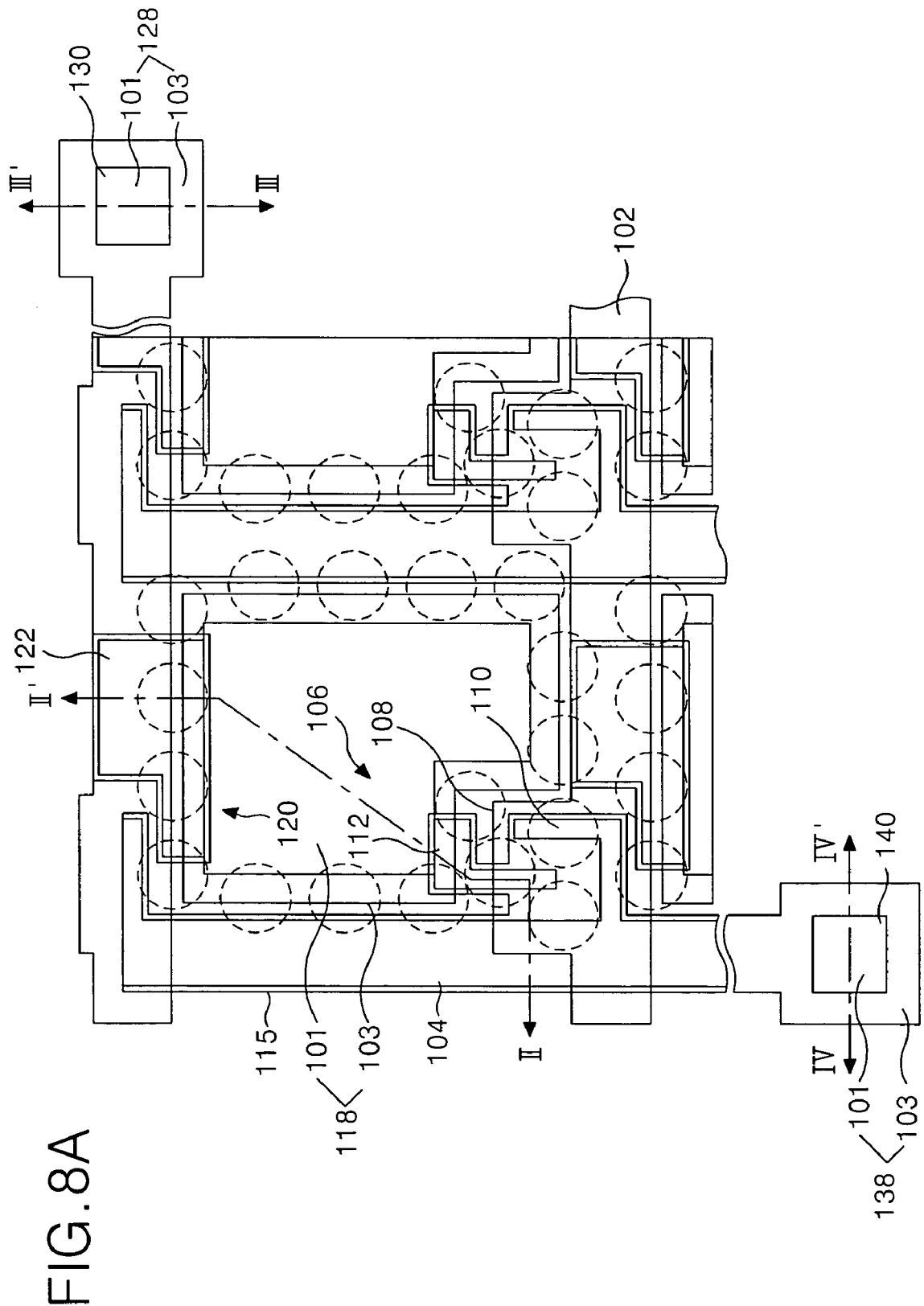
FIGS. 8A and 8B are a plane view and a cross-sectional view illustrating a third mask process of the transflective thin film transistor substrate according to the embodiment of the present invention.
Figure 8B:
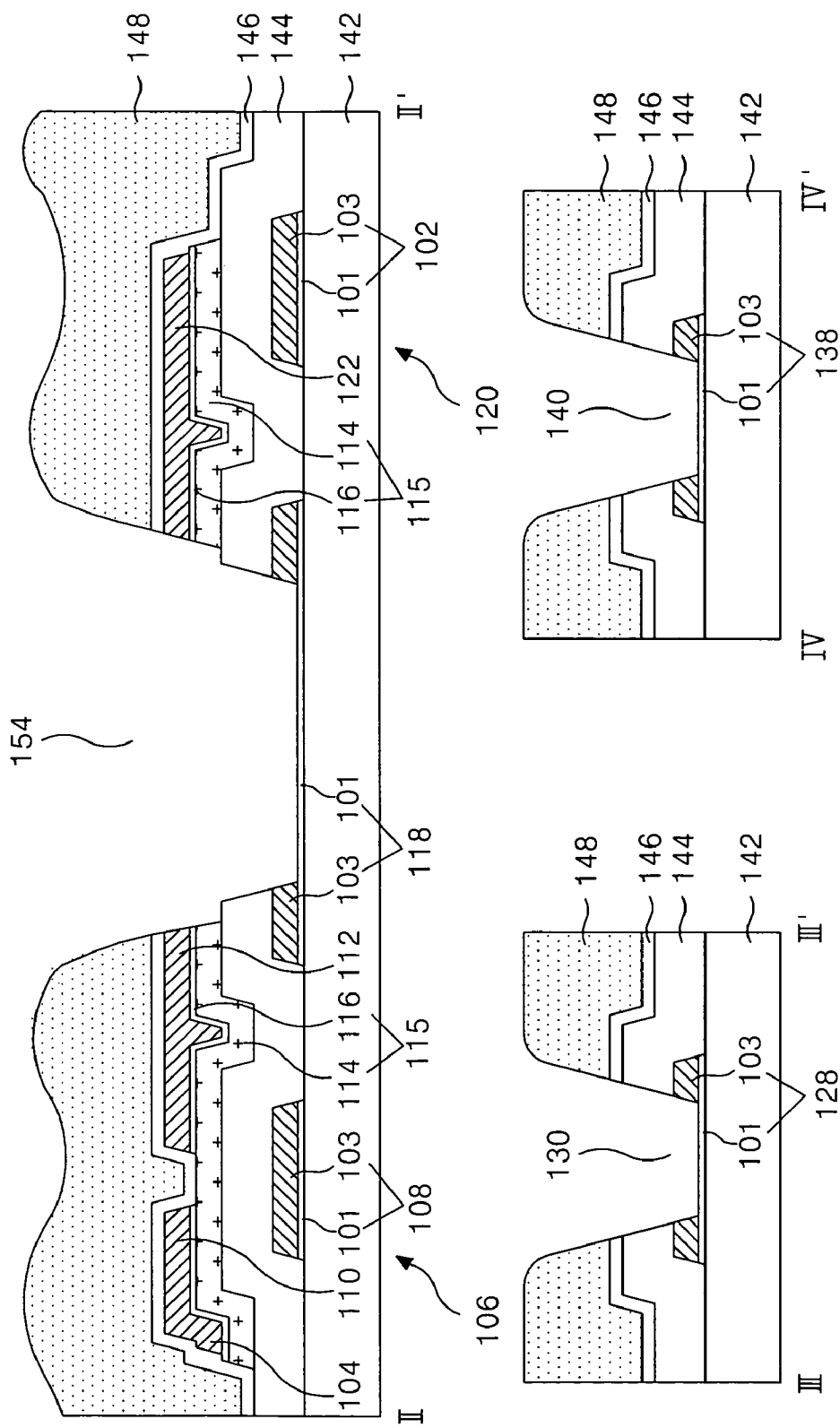

FIGS. 8A and 8B are a plane view and a cross-sectional view illustrating a third mask process in a fabricating method of the transflective thin film transistor substrate according to the embodiment of the present invention, and FIGS. 9A and 9B are cross-sectional views illustrating the third mask process of the present invention in detail.

The passivation film 146 and the organic film 148, having the transmission hole 154 at the transmission area and the first and the second holes 130 and 140 at the pad area, are formed on the gate insulating film 144 having the source drain pattern, by the third mask process. The passivation film 146 is used to protect the thin film transistor 106, but a step of forming the passivation film 140 can be omitted.

Referring to FIG. 9, the passivation film 146 is formed on the gate insulating film 144 where the source/drain pattern is formed by a deposition method such as sputtering, and the organic film 148 is formed on top thereof by a spin coating method. The passivation film 146 is formed of an inorganic insulating material as the gate insulating film 144, and the organic film 148 is formed of a photosensitive organic material such as acrylic resin. And then, the organic film 148 is exposed and developed using the third mask, that is, a half-tone mask 260 or a diffractive exposure mask.

For instance, the half-tone mask 260 includes a transparent quartz substrate 266, a partial transmission layer 254 formed of MoSx or the like on the transparent quartz substrate 266, and a shielding layer 262 formed of a metal material such as Cr, CrOx or the like on the partial transmission layer 254. In the half-tone mask 260, a shielding part in which the partial transmission layer 264 and the shielding layer 262 are overlapped each other intercepts ultraviolet ray, so that the organic film 148 maintains a relatively thicker thickness as in a first area 148A illustrated in FIG. 9B. Due to a partial transmission of ultraviolet lay, the organic film 148 corresponding to the partial part of the half-tone mask 260 having the partial transmission layer 264 without the shielding layer 262 has a relatively thinner thickness as in a second area 148B illustrated in FIG. 9B. The transmission part of the half-tone mask 260 without the shielding layer 262 and the partial layer 264 transmits entirely ultraviolet ray to form the transmission hole 154, the first contact hole 130 and the second contact hole 140 that penetrate the organic film 148, as illustrated in FIG. 9B. The transmission hole 154 of the organic film 148 is formed at a transmission area overlapped with the pixel electrode 118, and the first and the second contact holes 130 and 140 are overlapped with the gate pad 128 and the data pad 138, respectively. The reflection area includes both the first and second areas 148A and 148B of the organic film 148, and the second area 148B exists at the pad areas having the first and the second contact holes 130 and 140.

Then, a curing process is performed on the organic film 148 having the above structure. After the curing process, a surface of the organic film 148 has an embossed shape at the reflection and pad areas, as illustrated in FIG. 9C.

Subsequently, a dry etching process is performed using the organic film 148 as a mask to complete forming the transmission hole 154 in the pixel area and the first and the second contact holes 130 and 140 in the gate pad 128 and the data pad 138. The dry etching process is performed such that the passivation film 146, the gate insulating film 144 and the second conductive layer 103 are removed. In addition, side surfaces of the drain electrode 112, the upper storage electrode 122 and the semiconductor pattern under the upper storage electrode 122 are exposed during the dry etching process. Due to a difference in etching speed, an edge of the gate insulating film 144 has a projected structure as compared to the drain electrode 112, the upper storage electrode 122 and the semiconductor pattern under the upper storage electrode 122. The first conductive layer 101 of the pixel electrode 118 is exposed through the transmission hole 154, and a side surface of the second conductive layer 103 is exposed. Further, the first conductive layers 101 of the gate pad 128 and the data pad 138 are exposed and side surfaces of the second conductive layers 103 thereof are exposed through the first and the second contact holes 130 and 140, as illustrated in FIG. 9D.

Figure 10A:
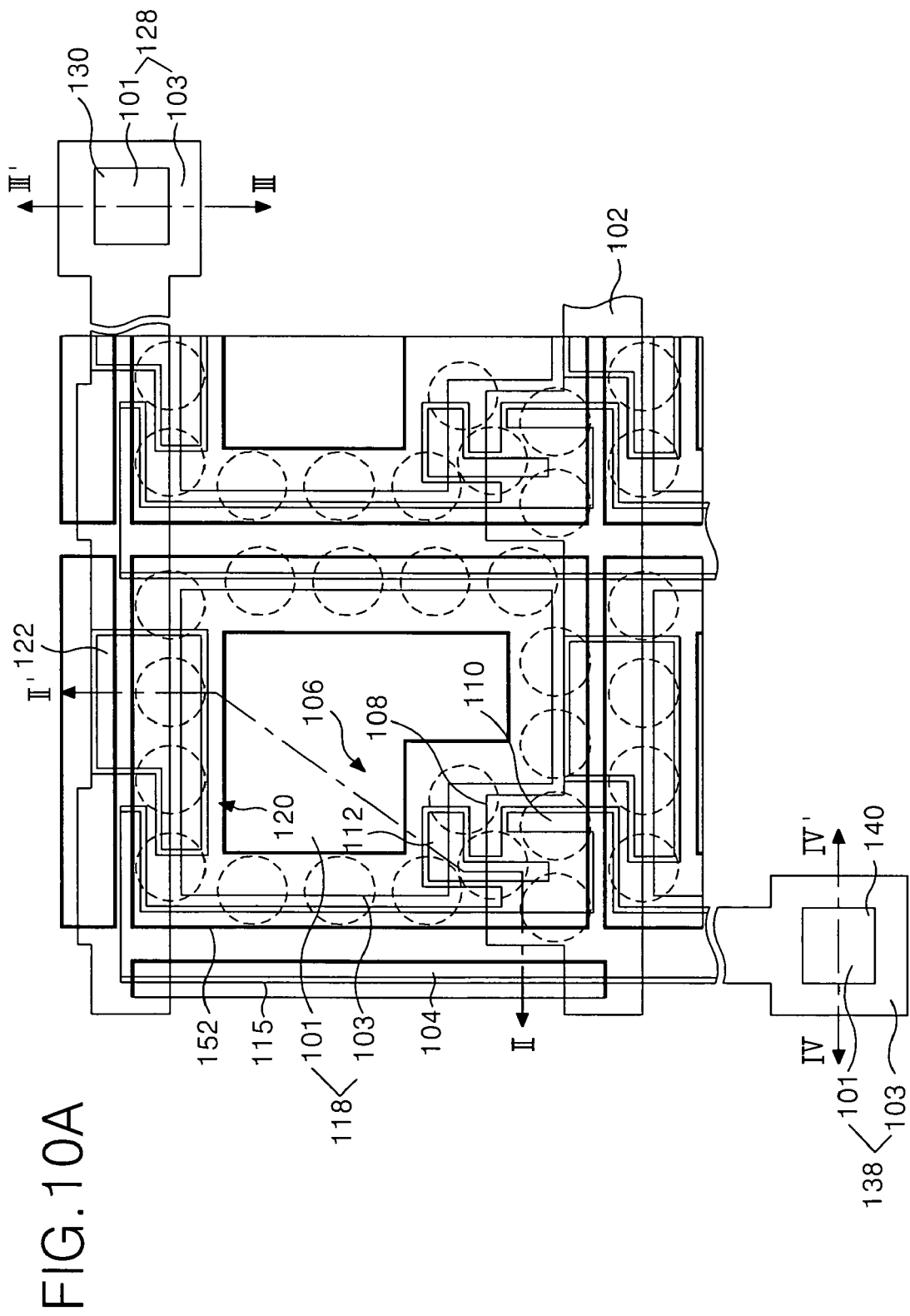

FIGS. 10A and 10B are a plane view and a cross-sectional view illustrating a fourth mask process of the transflective thin film transistor substrate according to the embodiment of the present invention.

The reflective electrode 152 is formed in a reflective area of each pixel by the fourth mask process.

Specifically, a reflective metal layer is formed on the organic film 148 having an embossed surface. Thus, the reflective metal layer maintains the embossed shape. The reflective metal layer is formed of a metal material that has a high reflectivity, for example, AlNd. Subsequently, the reflective metal layer is patterned by a photolithography process using the fourth mask and an etching process, thereby forming the reflective electrode 152 in a reflection area of each pixel. The reflective electrode 152 connects the drain electrode 112 with the pixel electrode 118 through an edge of the transmission hole 154, and connects the storage upper electrode 122 with the pixel electrode 118. Accordingly, no separate contact hole is required for connecting the pixel electrode 118 with the drain electrode 112 and the upper storage electrode 122, thereby increasing the aperture ratio of the transmission area. Further, the reflective electrode 152 is connected to the first conductive layer 101 of the pixel electrode 118 and to a side surface of the second conductive layer 103 (Mo) exposed through the transmission hole 154. Thus, the contact resistance between the reflective electrode 152 (AlNd) and the first conductive layer 101 (ITO) can be reduced.

Figure 11:
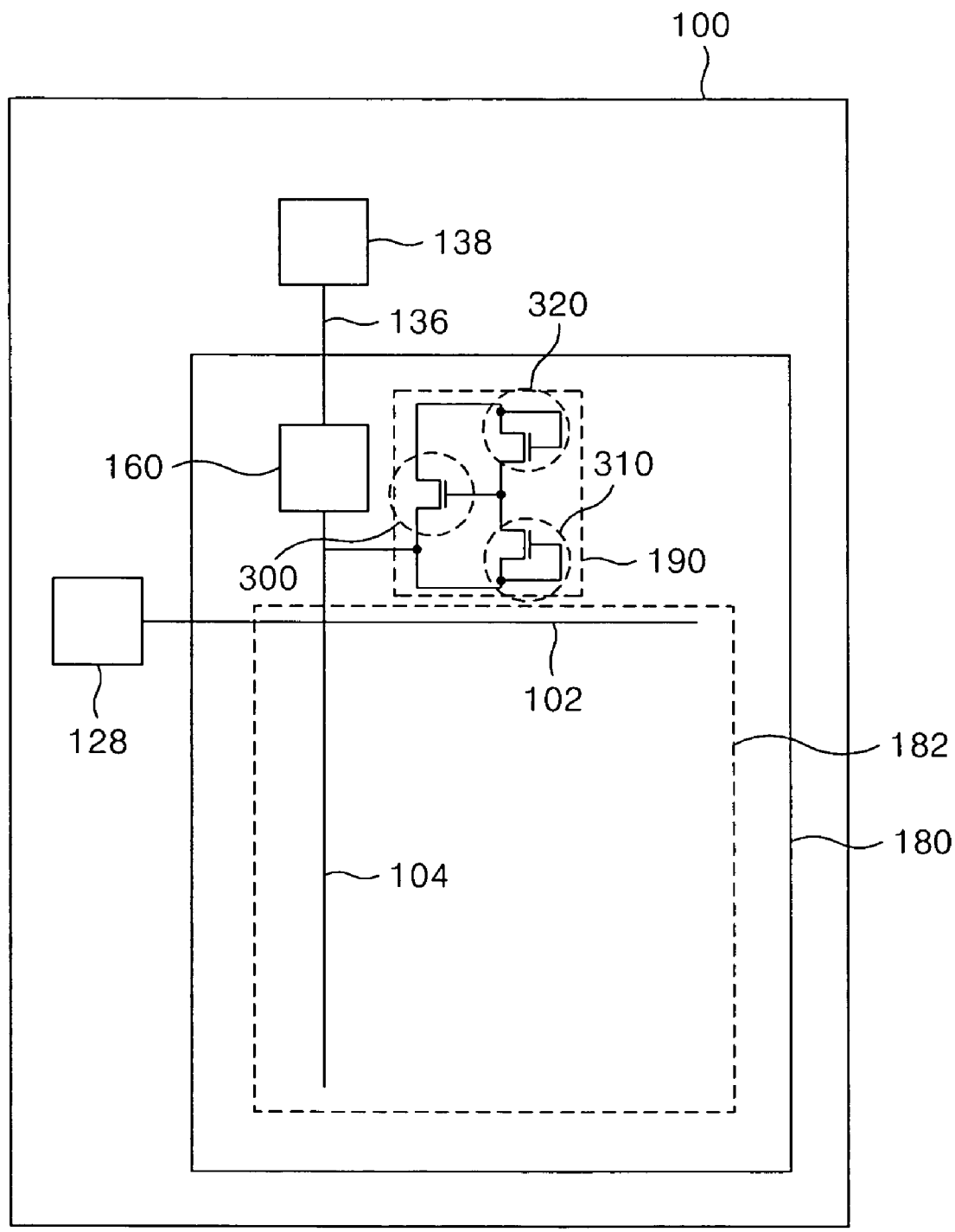
FIG. 11 is a plane view illustrating a surrounding portion of a transflective thin film transistor substrate according to an embodiment of the present invention.

FIG. 11 illustrates a surrounding portion of a transflective thin film transistor substrate according to an embodiment of the present invention.

The transflective thin film transistor substrate 100 includes a contact electrode 160 in order to connect a data pad 138 formed in the same layer as a gate pad 128 with a data line 104. In other words, the contact electrode 160 connects a data link 136 extended from the data pad 138 with the data line 104. The contact electrode 160 is formed of the same metal layer AlNd, AlNd/Mo as a reflective electrode 152 that is formed in each pixel area. Because the contact electrode 160 can be corroded by oxidization when it is exposed to the outside, the contact electrode 160 is located at an area sealed by a sealant 180, i.e., between the sealant 180 and an active area 182.

The thin film transistor substrate 100 further includes an electrostatic discharging device 190 for intercepting static electricity flowing into the active area 182. The electrostatic discharging device 190 is connected to the data line 104 or a gate line 102, and includes a plurality of thin film transistors 300, 310 and 320 having a reciprocal connection relationship. The electrostatic discharging device 190 causes an over-current to be discharged by having a low impedance at a high voltage area, thereby intercepting the static electricity inflow. It does not affect driving signals supplied through the gate line 102 or the data line 104 by having a high impedance in a normal driving condition. The electrostatic discharging device 190 requires a plurality of contact electrodes for reciprocally connecting the thin film transistors 300, 310 and 320. These contact electrodes are also formed of the same metal layer AlNd, AlNd/Mo as the reflective electrode 152. Accordingly, the electrostatic discharging device 190 is also formed at an area sealed by the sealant 180, i.e., between the sealant 180 and the active area 182.

Figure 12:
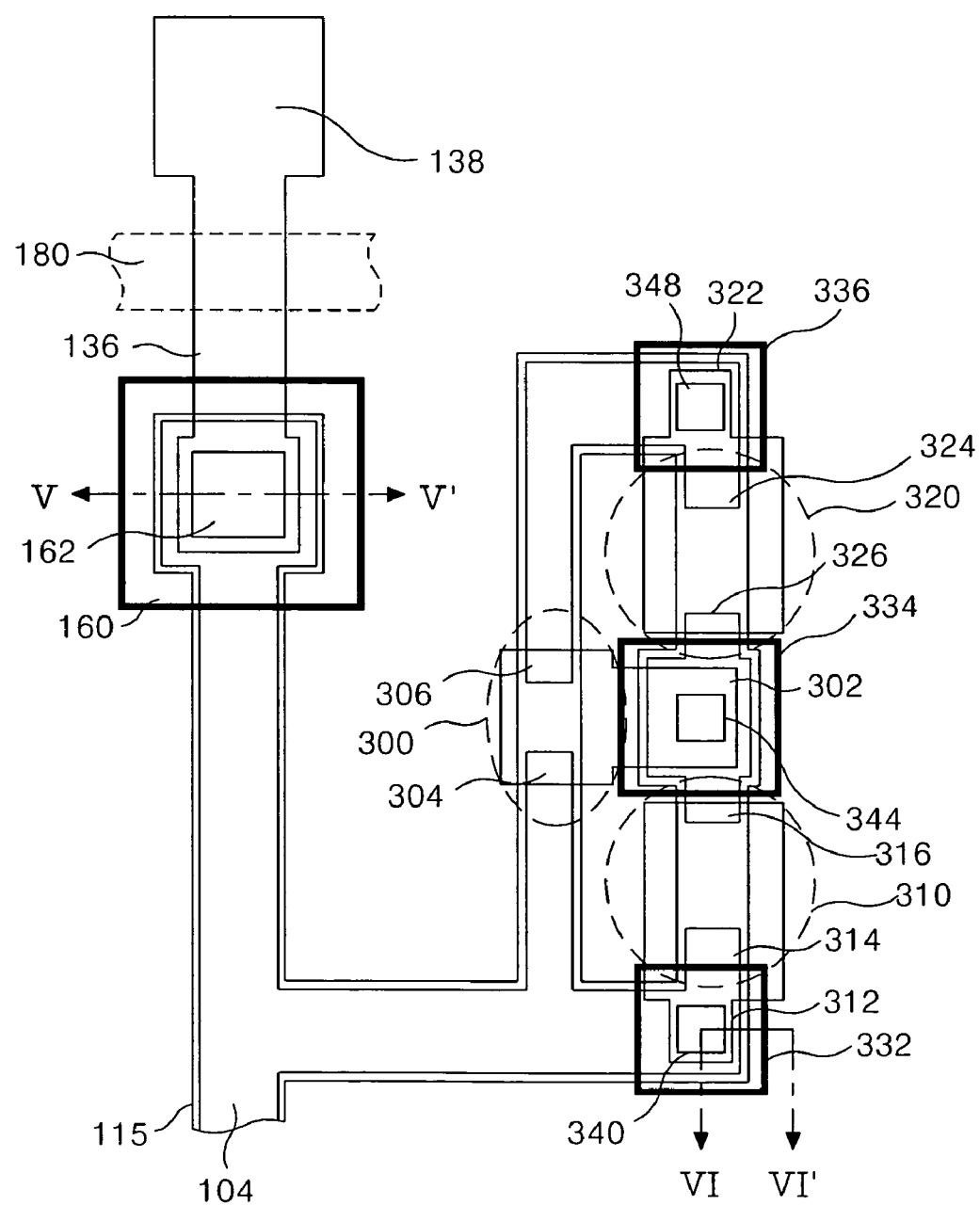
FIG. 12 is a plane view illustrating a static electricity prevention device area and a contact area of a data link and a data line shown in FIG. 11 in detail.

FIG. 12 is a plane view illustrating the electrostatic discharging device 190 and the contact electrode 160 connected to the data line 104 shown in FIG. 11 in detail, and FIG. 13 is a cross-sectional view illustrating the thin film transistor substrate taken along the line V-V', VI-VI' in FIG. 12.

Referring to FIGS. 12 and 13, a data link 136 is overlapped with an end portion of the data line 104 extended from the data pad 138 and located at an area which is to be sealed by the sealant 180. The data link 136 has a double-layer structure that includes first and second conductive layers 101 and 103 as the data pad 138.

The first contact electrode 160 is formed over a first contact hole 162 formed at an overlapped portion between the data link 136 and the data line 104 to connect the data line 104 to the data link 136. The first contact hole 162 penetrates an organic film 148, a passivation film 146, the data line 104, a semiconductor pattern 115, a gate insulating film 144, and the second conductive layer 103 to thereby expose the first conductive layer 101 of the data link 136. Accordingly, the first contact electrode 160 is connected to a side surface of the data line 104 and the second conductive layer 103 that are exposed through the first contact hole 162, and the first contact electrode 160 is connected to a surface of the first conductive layer 101 of the data link 136.

The electrostatic discharging device connected to the data line 104 includes second to fourth thin film transistors 300, 310 and 320.

The second thin film transistor 300 includes a second source electrode 304 connected to the data line 104, a second drain electrode 306 opposite the second source electrode 304, and a second gate electrode 302 overlapping the second source and drain electrodes 304 and 306 with the semiconductor pattern 115 and the gate insulating film 144 therebetween. Herein, the second gate electrode 302 has a double-layer structure of the first and second conductive layers 101 and 103.

The third thin film transistor 310 is connected to the second source electrode 304 and the second gate electrode 302 of the second thin film transistor in a diode form. For this, the third thin film transistor 310 includes a third source electrode 314 connected to the second source electrode 304, a third drain electrode 316 opposite the third source electrode 314, and a third gate electrode 312 overlapping the third source and drain electrodes 314, 316 with the semiconductor pattern 115 and the gate insulating film 144 therebetween. The third gate electrode 312 has a double-layer structure of the first and second conductive layers 101 and 103. The third gate electrode 312 is connected to the third source electrode 314 through a second contact electrode 332. A second contact hole 340 penetrates the organic film 148, the passivation film 146, the third source electrode 314, the semiconductor pattern 115, the gate insulating film 144 and the second conductive layer 103 of the third gate electrode 312 to expose the first conductive layer 101 of the third gate electrode 312.

The fourth thin film transistor 320 is connected to the second drain electrode 306 and the second gate electrode 302 of the second thin film transistor in a diode form. For this, the fourth thin film transistor 320 includes a fourth source electrode 324 connected to the second drain electrode 306, a fourth drain electrode 326 opposite the fourth source electrode 324, and a fourth gate electrode 322 overlapping the fourth source and drain electrodes 324, 326 with the semiconductor pattern 115 and the gate insulating film 144 therebetween. The fourth gate electrode 322 has a double-layer structure of the first and second conductive layers 101 and 103. The fourth drain electrode 326 is connected to the third drain electrode 316, and it is connected to the second gate electrode 302 through a third contact electrode 334 which is formed over a third contact hole 344. Further, the fourth gate electrode 332 is connected to the fourth source electrode 324 through a fourth contact electrode 336 which is formed over a fourth contact hole 348. The third contact hole 344 is formed to penetrate the organic film 148, the passivation film 146, the fourth drain electrode 326, the semiconductor pattern 115, the gate insulating film 144, and the first conductive layer 103 of the second gate electrode 302. The fourth contact hole 348 is formed to penetrate the organic film 148, the passivation film 146, the fourth source electrode 324 and the semiconductor pattern 115, the gate insulating film 144 and the first conductive layer 103 of the fourth gate electrode 322.

The first to fourth contact electrodes 160, 332, 334 and 336 are formed of the same metal layer as the reflective electrode 152 as described above. Accordingly, because the first to the fourth contact electrodes 160, 332, 334 and 336 are connected to the first conductive layer 103, that is, the transparent conductive layer, the contact resistance can be reduced as explained above.

The transflective thin film transistor substrate having the above structure can be formed by a four-mask process. This will be explained with reference to FIGS. 14A to 18B in detail.

Figure 14A:
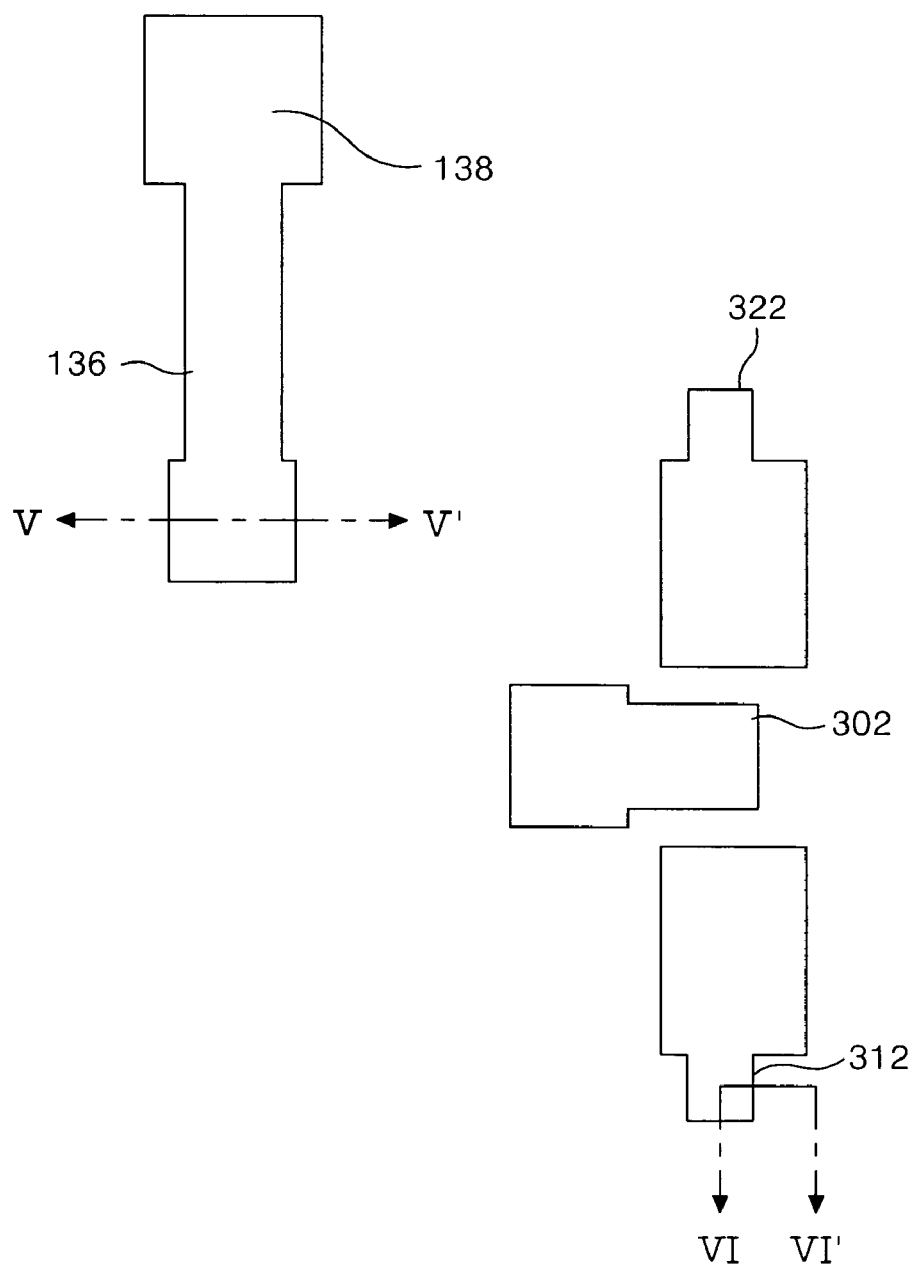

Referring to FIGS. 14A and 14B, a gate pattern is formed on a lower substrate 142 by a first mask process, wherein the gate pattern includes a data link 136 along with a data pad 138, and second to fourth gate electrodes 302, 312 and 322. The gate pattern has a double-layer structure that has first and second conductive layers 101 and 103. The first mask process is substantially the same as the process described in FIGS. 5A and 5B.

Figure 15A:
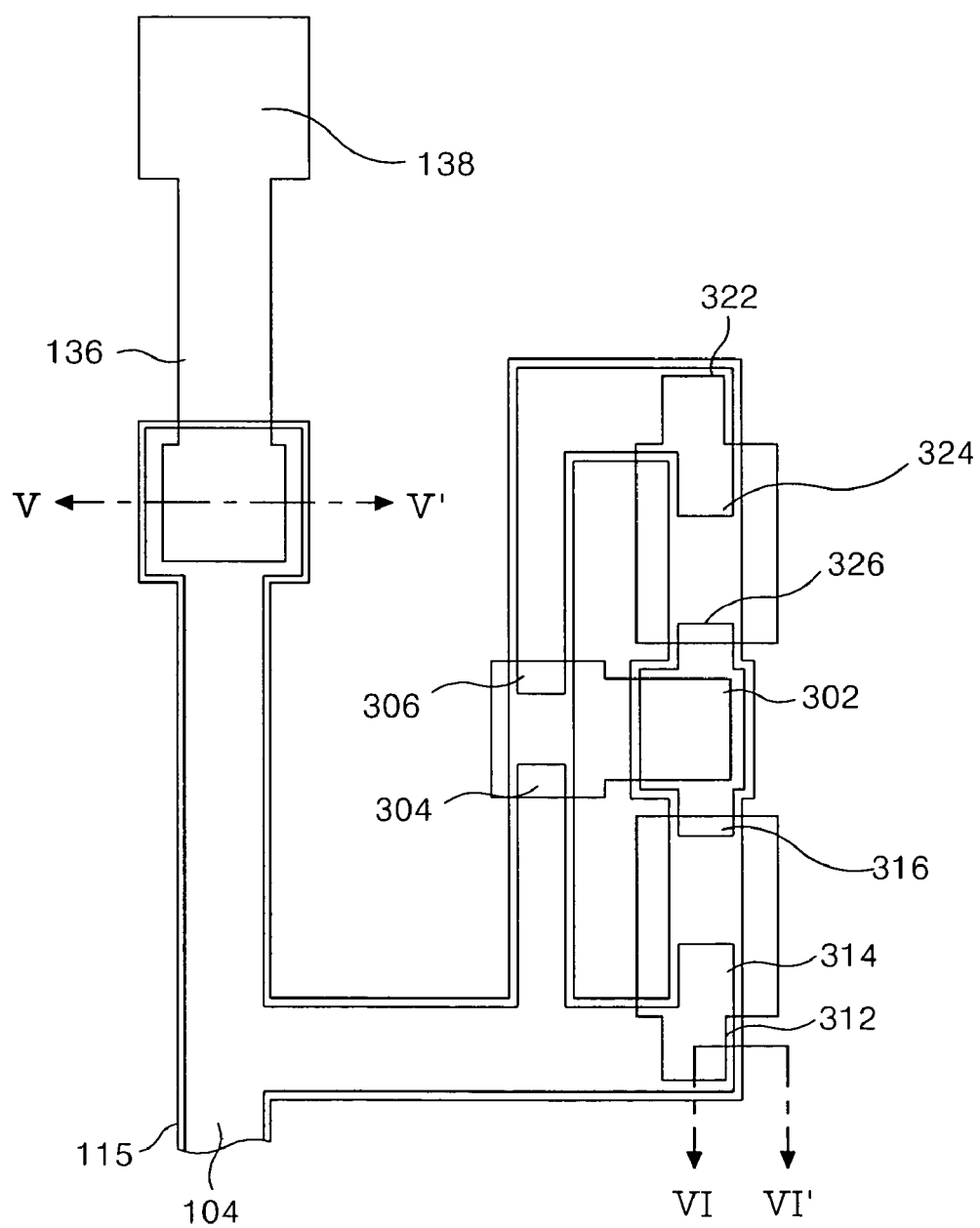

Referring to FIGS. 15A and 15B, the following patterns are formed by a second mask process: a gate insulating film 144, a semiconductor pattern 115 including an active layer 114 and an ohmic contact layer 116, and a source/drain pattern including a data line 104, second to fourth source electrodes 304, 314 and 324, second to fourth drain electrodes 306, 316 and 326. The second mask process is substantially the same as the process described in FIGS. 6A and 7E.

Figure 16A:
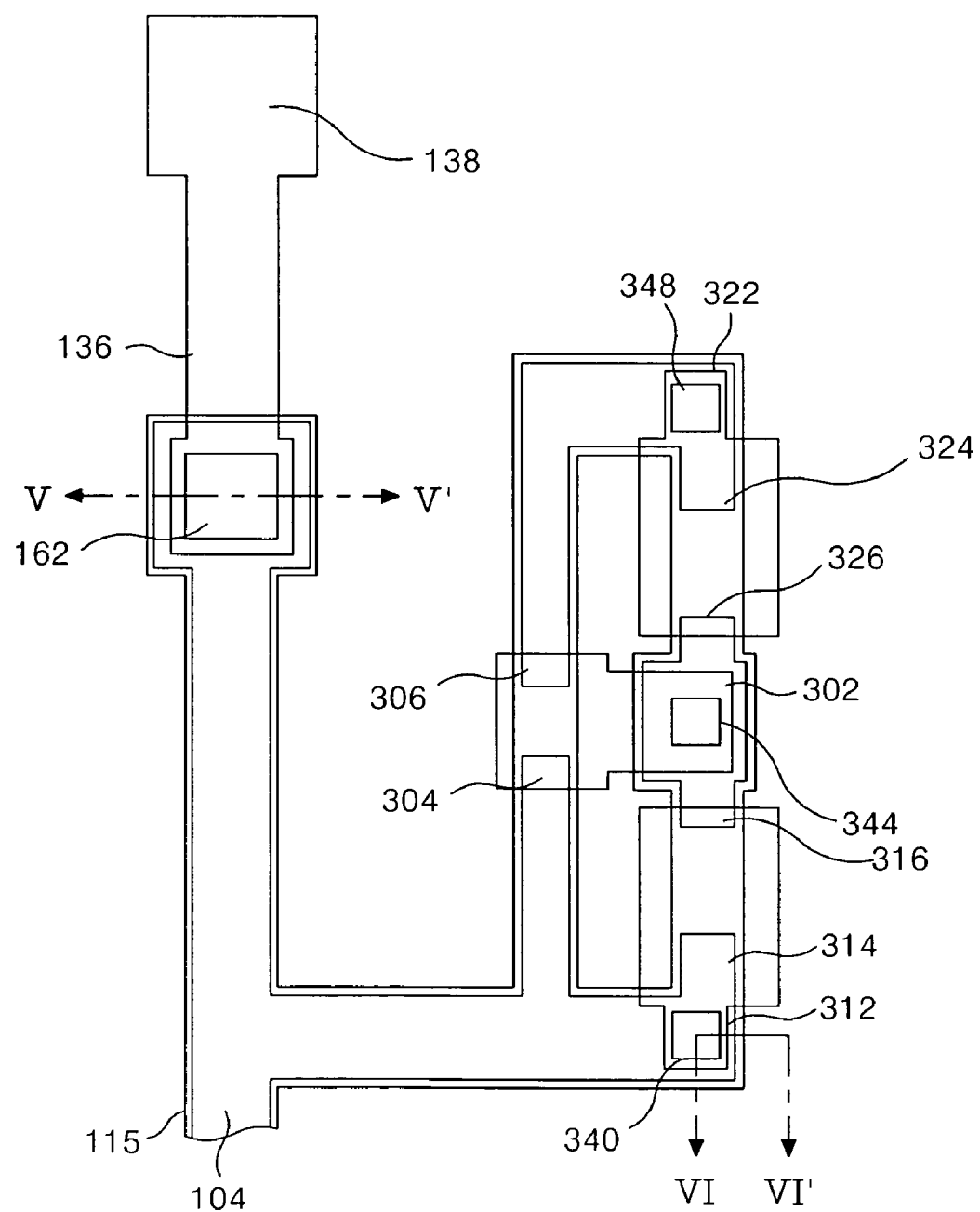

Referring to FIGS. 16A and 16B, a passivation film 146 and an organic film 148 are formed by a third mask process, wherein the organic film 148 has first to fourth contact holes 162, 340, 344 and 348 that penetrate the layers from the data link 136 to the second conductive layer 103 of each of the second and the third gate electrodes. The third mask process is substantially the same as the process described in FIGS. 8A and 9D.

Figure 17A:
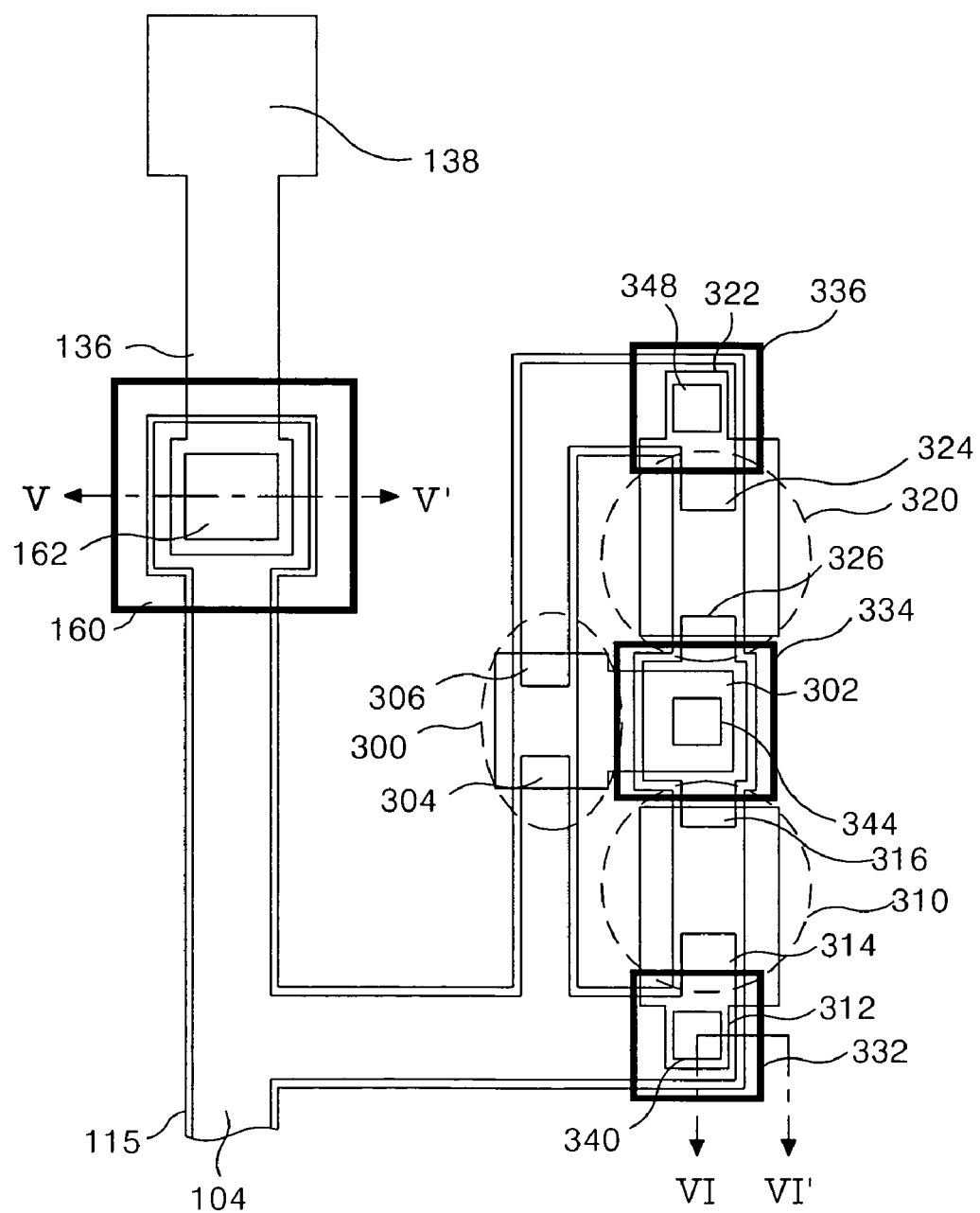
FIGS. 17A and 17B are a plane view and a cross-sectional view illustrating a fourth mask process of the transflective thin film transistor substrate in FIG. 13.
Figure 17B:
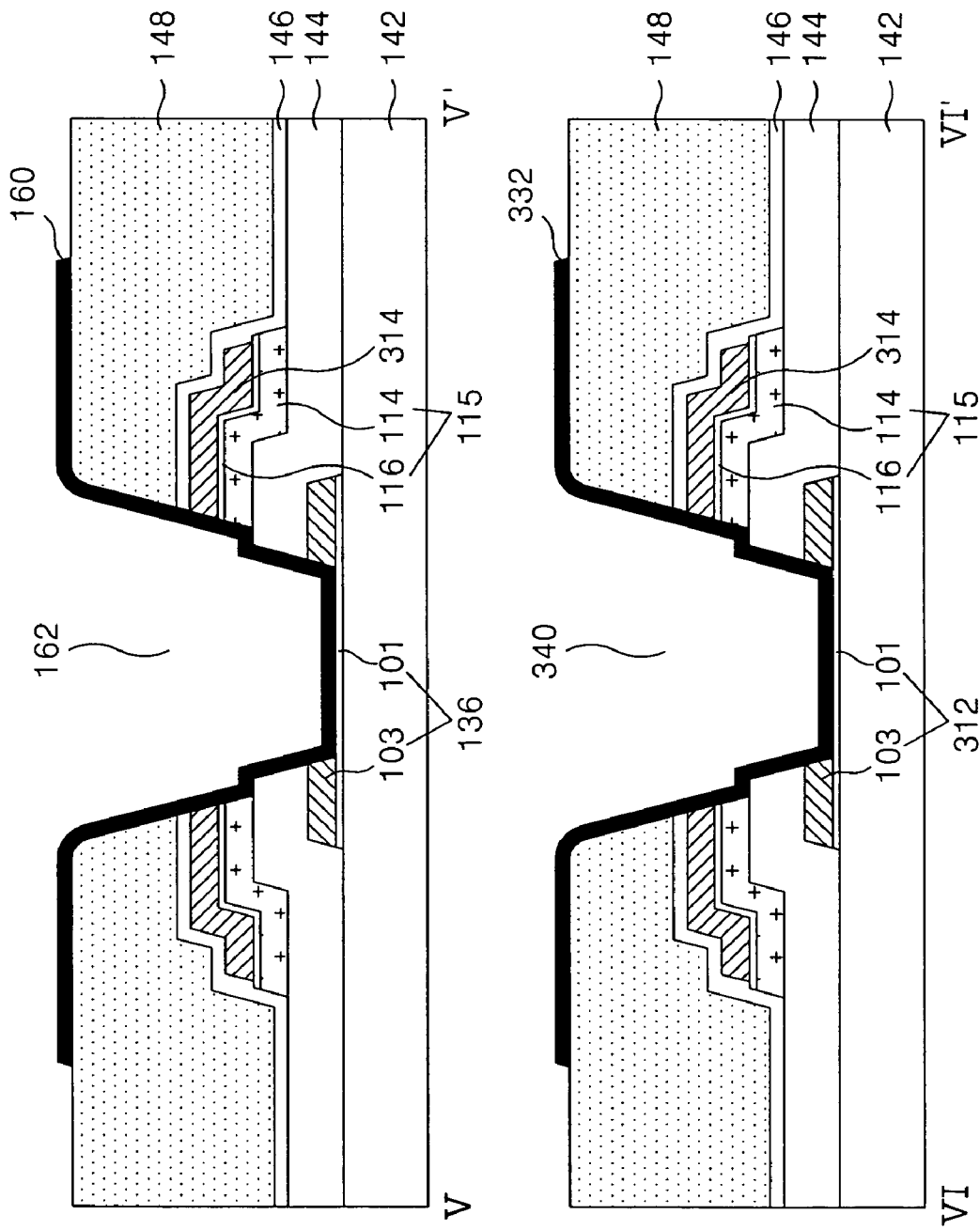

Referring to FIGS. 17A and 17B, first to fourth contact electrodes 162, 340, 344 and 348 are formed of a metal material identical to the reflective electrode 152, by a fourth mask process. The fourth mask process is substantially the same as the process described in FIGS. 10A and 10B.

As described above, in the transflective thin film transistor substrate and the method of fabricating the same according to the present invention, the pixel electrode and the pads have a double-layer structure that includes the transparent conductive layer as the gate pattern and the transparent conductive layer is exposed when patterning the organic film using a half-tone mask. Further, the reflective electrode connects the drain electrode and the upper storage electrode to the pixel electrode. Accordingly, the transflective thin film transistor substrate can be fabricated by a simple process, i.e., a four mask process, because a separate mask process for forming a contact hole to connect the pixel electrode with the drain electrode and the upper storage electrode is not required, thereby increasing the aperture ratio of the transmission area.

Further, the contact electrode formed of the same metal as the reflective electrode for connecting the data link to the data line (the data link and the data line are formed at layers different from each other) and the static electricity prevention device can also be formed on the transflective thin film transistor substrate by the four mask process.

Moreover, the reflective electrode (AlNd) is connected to the first conductive layer (ITO) via the second conductive layer (Mo) of the pixel electrode. The contact resistances of both the reflective electrode and the pixel electrode can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
  a first substrate and a second substrate;
  a gate line having a double-layer structure including a first transparent conductive layer and a second opaque conductive layer on the first substrate;
  a first insulation film on the gate line;
  a data line crossing the gate line to define a pixel region, the pixel region having a transmission area and a reflection area;
  a thin film transistor connected to the gate and data lines;
  a pixel electrode having the first transparent conductive layer and the second opaque conductive layer along a boundary of the first transparent conductive layer;
  a upper storage electrode over the gate line with the gate insulating film therebetween for forming a storage capacitor;
  a transmission hole passing through the second opaque conductive layer of the pixel electrode from a second insulation film to expose the first transparent conductive layer of the pixel electrode;
  a reflective electrode in the reflection area, the reflective electrode connecting the pixel electrode with a drain electrode and the upper storage electrode at an edge of the transmission hole;
  a gate pad extended from the gate line, the gate pad including the first transparent conductive layer exposed through a first pad contact hole, the first pad contact hole passing through the second insulation film to the second opaque conductive layer;
  a data pad connected to the data line via a data link, the data pad including the first transparent conductive layer exposed through a second pad contact hole, the second pad contact hole passing through the second insulation film to the second opaque conductive layer; and
  a liquid crystal layer between the first and second substrates.

2. The device of claim 1, wherein the second insulation film is formed of an organic material.

3. The device of claim 1, further comprising a third insulation film between the thin film transistor and the second insulation film.

4. The device of claim 3, wherein the transmission hole passes through the third insulation film.

5. The device of claim 1, further comprising:
a first contact hole passing through the second insulation film, the data line, the first insulation film and the second opaque conductive layer of the data link to expose the first transparent conductive layer, the data link having the double-layer structure and overlapping an end of the data line; and
a first contact electrode laterally connected to the data line and the second opaque conductive layer via the first contact hole, and connected to a surface of the data link.

6. The device of claim 5, wherein the first contact electrode is formed of the same metal as the reflective electrode.

7. The device of claim 1, further comprising an electrostatic discharging device connected to one of the data line and the gate line.

8. The device of claim 7, wherein the electrostatic discharging device includes:
a second thin film transistor connected to one of the data line and the gate line;
a third thin film transistor connected between a gate electrode and a source electrode of the second thin film transistor in a diode form;
a fourth thin film transistor connected between a gate electrode and a drain electrode of the second thin film transistor in a diode form;
a second contact electrode connected to a source electrode and a gate electrode of the third thin film transistor through the second contact hole;
a third contact electrode connected a drain electrode of the third or fourth thin film transistor to the gate electrode of the second thin film transistor through a third contact hole; and
a fourth contact electrode connected a source electrode and a gate electrode of the fourth thin film transistor through a fourth contact hole.

9. The device of claim 8, wherein the gate electrodes of the second, third, and fourth thin film transistors are formed of the double-layer structure.

10. The device of claim 8, wherein the second, third, and fourth contact electrodes are formed of the same material as the reflective electrode.

11. The device of claim 8, wherein the second, third, and fourth contact holes penetrate the second insulation film, the source or drain electrode, the semiconductor pattern, the first insulation film and the second conductive layer of the gate electrode to expose the fist conductive layer of the gate electrode.

12. The device of claim 8, wherein the first, second, third and fourth contact electrodes are formed between a sealant and an active area on which an image is displayed.

13. The device of claim 1, wherein the second insulation film has an embossed surface.

14. The device of claim 13, wherein the reflective electrode has the embossed surface.

15. A method of fabricating a liquid crystal display device, comprising:
providing a first substrate and a second substrate;
forming a gate line, a gate electrode, and a pixel electrode having a double-layer structure on the first substrate using a first mask, the double-layer structure including a first transparent conductive layer and a second opaque conductive layer;
forming a first insulation film, a semiconductor pattern on the first insulation film, a source/drain pattern having an upper storage electrode, a drain electrode, a source electrode, a data line using a second mask, the data and gate lines defining a pixel region having a transmission area and a reflection area;
forming a second insulation film on the source/drain pattern and a transmission hole by passing through the second insulation film to the second opaque conductive layer of the pixel electrode in the transmission area to expose the first transparent conductive layer of the pixel electrode using a third mask; and
forming a reflective electrode in the reflection area using a fourth mask, the reflective electrode connecting the pixel electrode with the drain electrode and the storage electrode at an edge of the transmission hole.

16. The method of claim 15, wherein the data line overlaps the semiconductor pattern.

17. The method of claim 15, wherein the second insulation film is formed of an organic material.

18. The method of claim 15, wherein the forming the transmission hole further includes forming a third insulation film on the source/drain pattern.

19. The method of claim 18, wherein the transmission hole is formed by passing through the third insulation film.

20. The method of claim 15, further comprising:
forming a gate pad extended from the gate line and a data pad connected to the data line using the first mask; and
forming first and second pad contact holes by passing through the second insulation film in the gate and data pad regions to the second opaque conductive layer of the gate and data pads using the third mask.

21. The method of claim 20, wherein the gate and data pads have the double-layer structure.

22. The method of claim 20, wherein the forming the transmission hole, the first pad contact hole and the second pad contact hole includes:
forming and patterning the second insulation film using the third mask to form the transmission hole, the first and the second pad contact holes in the second insulation film;
forming an embossed surface of the second insulation film in the reflection region by curing the patterned second insulation film; and
penetrating the transmission hole, the first pad contact hole and the second pad contact hole to the pixel electrode and the second conductive layer of the gate pad and the data pad using the cured second insulation film as a mask.

23. The method of claim 22, wherein the third mask includes one of a half-tone mask and diffractive exposure mask.

24. The method of claim 15, further comprising:
forming a data link extended from the data pad to overlap with an end of the data line using the first mask;
forming a first contact hole by exposing the first transparent conductive layer of the data link by penetrating from the second insulation film through the data line to the second opaque conductive layer of the data link using the third mask; and
forming a first contact electrode connecting the exposed data line to the data link exposed through the first contact hole using the fourth mask.

25. The method of claim 24, wherein the first contact electrode is formed between a sealant and an active area on which an image is displayed.

26. The method of claim 15, further comprising forming an electrostatic discharging device,
wherein the electrostatic discharging device includes:
a second thin film transistor connected to one of the data line and the gate line;

a third thin film transistor connected between a gate electrode and a source electrode of the second thin film transistor in a diode form; and a fourth thin film transistor connected between a gate electrode and a drain electrode of the second thin film transistor in a diode form.

27. The method of claim 26, wherein the forming the electrostatic discharging device includes:

forming gate electrodes of the second, third, and fourth thin film transistors using the first mask, the gate electrodes having the double-layer structure;

forming semiconductor patterns and source and drain electrodes of the second, third, and fourth thin film transistors on the first insulation film using the second mask;

forming second, third and fourth contact holes using the third mask; and forming second, third and fourth contact electrodes using the fourth mask.

28. The method of claim 27, wherein the second contact hole is formed at an overlap portion of the source electrode and the gate electrode of the third thin film transistor, the third contact hole is formed at an overlap portion of the drain electrode of the third or the fourth thin film transistor and the gate electrode of the second thin film transistor and the fourth contact hoe is formed at an overlap portion of the source electrode and the gate electrode of the fourth thin film transistor.

29. The method of claim 27, wherein the second contact electrode connected to the source electrode and the gate electrode of the third thin film transistor through the second contact hole, the third contact electrode connected the drain electrode of the third or the fourth thin film transistor to the gate electrode of the second thin film transistor through the third contact hole, and the fourth contact electrode exposing the source electrode and the gate electrode of the fourth thin film transistor through the fourth contact hole.

30. The method of claim 27, wherein the second, third and fourth contact electrodes are formed between a sealant and an active area on which an image is displayed.

* * * * *